(12) United States Patent
Anbalagan et al.

(10) Patent No.: US 8,635,277 B2
(45) Date of Patent: Jan. 21, 2014

(54) MEDIATED LENDING OF DIGITAL ITEMS

(75) Inventors: Karthik G. Anbalagan, Redmond, WA (US); Tom Killalea, Seattle, WA (US); Emily Margaret Anderson, Seattle, WA (US); Valeria A. Pakhomova, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 264 days.

(21) Appl. No.: 13/075,013

(22) Filed: Mar. 29, 2011

(65) Prior Publication Data

US 2012/0254303 A1 Oct. 4, 2012

(51) Int. Cl.
*G06F 15/16* (2006.01)

(52) U.S. Cl.
USPC .......... 709/204; 705/14.1; 705/26.1; 709/205

(58) Field of Classification Search
USPC ......... 709/204, 205, 206, 231, 232; 705/26.1, 705/909, 14.25, 14.35, 326, 307, 314, 340, 705/344
See application file for complete search history.

(56) References Cited

U.S. PATENT DOCUMENTS

| | | | |
|---|---|---|---|
| 4,656,624 A * | 4/1987 | Collins et al. | 370/270 |
| 5,732,216 A | 3/1998 | Logan et al. | |
| 5,925,081 A * | 7/1999 | Hawkins et al. | 701/24 |
| 6,233,682 B1 | 5/2001 | Fritsch | |
| 6,704,733 B2 | 3/2004 | Clark et al. | |
| 6,873,840 B1 | 3/2005 | von Alten | |
| 7,249,107 B2 | 7/2007 | Yaacovi | |
| 7,546,524 B1 | 6/2009 | Bryar et al. | |
| 7,756,753 B1 * | 7/2010 | McFarland | 705/26.1 |
| 8,073,733 B1 | 12/2011 | Caland | |
| 8,132,094 B1 | 3/2012 | Bryar et al. | |
| 2001/0033659 A1 | 10/2001 | Eisenberg | |
| 2002/0091634 A1 * | 7/2002 | Eubanks | 705/39 |
| 2004/0174980 A1 * | 9/2004 | Knott et al. | 379/266.01 |
| 2004/0199545 A1 * | 10/2004 | Wagner et al. | 707/104.1 |
| 2004/0215554 A1 | 10/2004 | Kemper et al. | |
| 2004/0268418 A1 | 12/2004 | Gray et al. | |
| 2005/0004837 A1 | 1/2005 | Sweeney et al. | |
| 2005/0021750 A1 | 1/2005 | Abrams | |
| 2005/0289032 A1 * | 12/2005 | Hoblit | 705/35 |
| 2006/0129780 A1 * | 6/2006 | Dunshea et al. | 711/170 |

(Continued)

OTHER PUBLICATIONS

Office action for U.S. Appl. No. 12/792,518, mailed on Sep. 20, 2012, Freed et al., "Referring, Lending, and Reselling of Digital Items", 17 pages.

(Continued)

*Primary Examiner* — Hassan Phillips
*Assistant Examiner* — Siren Wei
(74) *Attorney, Agent, or Firm* — Lee & Hayes, PLLC

(57) ABSTRACT

Digital items may be lent from one user to another. A lending system may facilitate matching users that have a digital item to lend with users that wish to borrow a digital item. Each user may have a reputation associated with his or her lending behavior that is represented as a lending metric. The lending metric may show whether a given user is primarily a lender or borrower of digital items. Heavy borrowers that do not engage in commensurate lending may be penalized. Multiple users that lend and borrow digital items from one another may be connected in a social network. The nature of a relationship in the social network may and the lending metrics of users are factors used to make lending decisions.

41 Claims, 12 Drawing Sheets

(56) References Cited

U.S. PATENT DOCUMENTS

| | | | |
|---|---|---|---|
| 2006/0143134 A1* | 6/2006 | So et al. | 705/59 |
| 2006/0149572 A1* | 7/2006 | Auzins et al. | 705/1 |
| 2006/0178905 A1* | 8/2006 | Ayers et al. | 705/1 |
| 2006/0179129 A1 | 8/2006 | Clayton et al. | |
| 2007/0019019 A1* | 1/2007 | Yoshikawa et al. | 347/14 |
| 2007/0061704 A1 | 3/2007 | Simova et al. | |
| 2007/0162502 A1 | 7/2007 | Thomas et al. | |
| 2007/0198426 A1 | 8/2007 | Yates | |
| 2007/0201701 A1 | 8/2007 | Kudelski | |
| 2007/0201702 A1 | 8/2007 | Hendricks et al. | |
| 2007/0276817 A1* | 11/2007 | Massonnie et al. | 707/3 |
| 2007/0288107 A1* | 12/2007 | Fernandez-Ivern et al. | 700/91 |
| 2008/0046976 A1* | 2/2008 | Zuckerberg | 726/4 |
| 2008/0065514 A1* | 3/2008 | Eaton | 705/27 |
| 2008/0104624 A1 | 5/2008 | Narasimhan et al. | |
| 2008/0148069 A1 | 6/2008 | Tsuria et al. | |
| 2008/0189367 A1 | 8/2008 | Okumura | |
| 2008/0201225 A1 | 8/2008 | Maharajh et al. | |
| 2008/0201376 A1 | 8/2008 | Khedouri et al. | |
| 2009/0024925 A1 | 1/2009 | Stevens | |
| 2009/0052778 A1 | 2/2009 | Edgecomb et al. | |
| 2009/0260067 A1* | 10/2009 | Racabi | 726/7 |
| 2009/0282438 A1* | 11/2009 | White | 725/44 |
| 2009/0319288 A1 | 12/2009 | Slaney et al. | |
| 2009/0323640 A1* | 12/2009 | Chakrabarti et al. | 370/335 |
| 2010/0086130 A1* | 4/2010 | Wang et al. | 380/46 |
| 2010/0088314 A1* | 4/2010 | Kuang | 707/733 |
| 2010/0095201 A1 | 4/2010 | Sawada | |
| 2010/0106659 A1 | 4/2010 | Stefik et al. | |
| 2010/0131385 A1 | 5/2010 | Harrang et al. | |
| 2010/0138867 A1 | 6/2010 | Wong et al. | |
| 2010/0217811 A1* | 8/2010 | Kay | 709/206 |
| 2010/0262515 A1 | 10/2010 | Brewer | |
| 2011/0166928 A1 | 7/2011 | Robinson et al. | |

OTHER PUBLICATIONS

PCT Search Report mailed Jun. 20, 2012 for PCT application No. PCT/US12/30982, 8 pages.

Liu, et al., "Digital Rights Management for Content Distribution", Australasian Information Security Workshop, Dec. 2003, Adelaide, Australia, Retrieved online on Aug. 15, 2011 at http://portal.acm.org/citation.cfm?id=827987.827994, entire document.

PCT Search Report mailed Aug. 26, 2011 for PCT application No. PCT/US11/38696, 8 pages.

Unlu, et al., "Functional Reference Model for Digital Rights Management Systems", Proceedings of the 15th ITS Conference, Dec. 2004, Retrieved online on Aug. 15, 2011 at http://userpage.fu-berlin.de/~jmueller/its/conf/berlin04/Papers/%DCnt%FC.pdf, entire document.

Office action for U.S. Appl. No. 13/075,054, mailed on Jan. 25, 2013, Anbalagan et al., "Identification of Borrowers for Digital Items", 13 pages.

Office action for U.S. Appl. No. 13/075,036, mailed on Feb. 21, 2013, Anbalagan et al., "Lending Digital Items to Identified Recipients", 53 pages.

Office action for U.S. Appl. No. 12/792,518, mailed on Feb. 7, 2013, Freed et al., "Referring, Lending, and Reselling of Digital Items", 16 pages.

\* cited by examiner

MEDIATED LENDING OF DIGITAL ITEMS

BACKGROUND

A large and growing population of people enjoys entertainment through consumption of digital content items, such as music, movies, images, books and other types of digital content. Many people today consume digital content through a wide variety of electronic devices. Among these electronic devices are electronic book readers, cellular telephones, personal digital assistants (PDAs), portable media players, tablets, netbooks, and the like.

As more content is made available in digital form, the economic landscape for content creation, production, and distribution is evolving. This is particularly the case for music, movies, and electronic books (or "eBooks"). Such content items may be distributed online to electronic devices, without production of a portable physical medium, such as a tape cassette, CD, DVD, or physical paper-based book. As a result, many of the transaction costs associated with traditional channels of distribution on physical media are being reduced or eliminated entirely. This leads to the possibility of new economic and social models involving selling, lending, and borrowing of digital items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
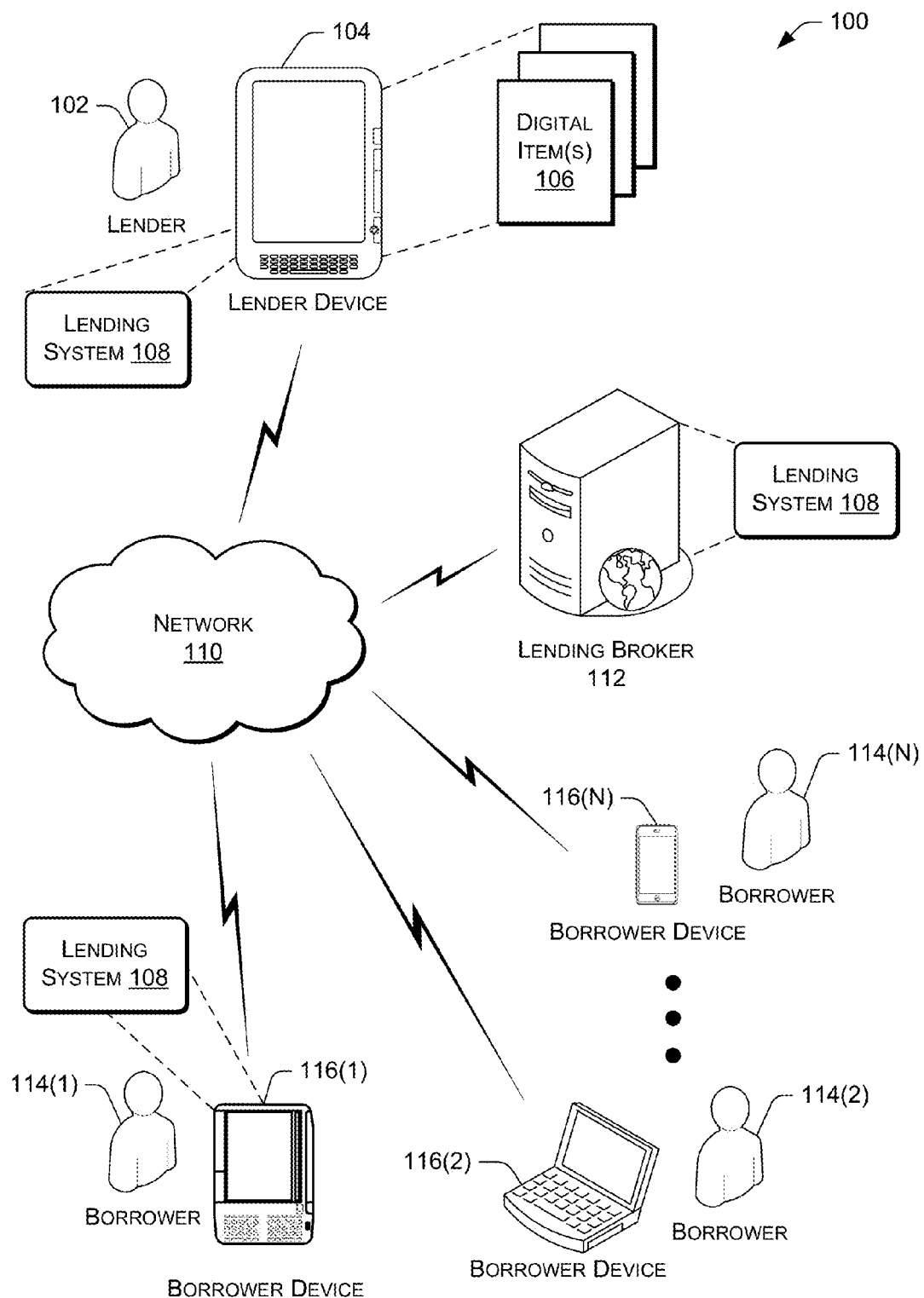
FIG. 1 illustrates an architecture of computers and networks in which various models for lending of digital items and calculating lending metrics may be implemented.

This disclosure describes various architectures and techniques in which digital items, such as electronic books (or "eBook"), may be loaned and borrowed. The architectures provide a functional environment to permit transfer of such digital items, as well as tracking of the lending behavior as a "lending metric." As one scenario, a user may lend a digital item, such as an eBook, to another user and receive an increase in his or her lending metric. Conversely, the user may also borrow a digital item from another user in which case the user's lending metric is decreased.

In another scenario, a user may wish to lend a digital item to a "friend" or "follower" in a social network. A recommendation may be provided to the user automatically upon finishing the digital item (e.g., after reading an entire eBook) to lend his or her digital item to another user in the social network. The system that generates the recommendations may be configured to recommend lending to users based on distance or reputation in the social network or to users with high lending metrics more so than other users.

In another scenario, the user may have digital items to lend and may also wish to borrow certain digital items. A loan-matching infrastructure may identify another user with complementary lendable items and borrowing desires. The loan matching may additionally function as a mechanism for introducing users that are in the same social network but not yet connected to one another in that social network, or it may serve to strengthen the relationship between users who are already connected.

As a further scenario, the architecture may enable a user with a lendable digital item to broadcast and/or narrowcast the availability of the digital item to just friends or to many other users. One of multiple users that respond to the broadcast/narrowcast may be selected based on speed of response, lending metric, social network relationship, and the like. For digital items that are able to be lent only a limited number of times, this technique of soliciting many responses may assist the user in deciding which user or users are allowed to borrow the digital item.

In a further scenario, or in conjunction with any of the above scenarios, the recipient of a loaned digital item may annotate or "markup" the digital item with comments, notes, etc. The lender of the digital item may have no interest in this other user's annotations and may prefer to receive his or her digital item returned without the annotations of another. Therefore, annotations made to a loaned digital item may be stored in association with the user that made those annotations (e.g., stored as part of a user account, linked to a user ID, etc.). The annotations may persist even after the digital item has been returned and the borrower may view his or her annotations separate from the digital item (e.g., when he or she does not have access to a copy). The user that generated the annotations (e.g., the borrower) may designate those annotations as publicly available so that anyone who consumes the same digital item may choose to view those public annotations. Additionally, the annotations may be automatically associated with any copy of the digital item that becomes available to the borrower. For example, if the borrower later purchases a copy of the same digital item he or she previously borrowed and annotated, those previous annotations will appear in the purchased copy.

The digital items may be manifest in many different ways including, for example, as text-based items, audio items, video items, multimedia items, graphical items, and so forth. For discussion purposes, the architecture and techniques are described in the context of eBook reader devices and electronic books. The terms "electronic book" and/or "eBook," as used herein, include electronic or digital representations of printed works (or portions of printed works), as well as digital content that may include text, multimedia, hypertext and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc. However, certain concepts described herein are also applicable to other types of digital content items, such as music, audio books, video, and other content items that people watch, listens to, consume, or otherwise experience.

Further, eBooks are just one form of a common work. The common work may represent the text of the book regardless of the format. For example, an eBook may also be released in other forms, such as paperback, hardcover, and audio. Although a rights holder such as a publisher, author, distributor etc. may have rights such as a copyright in the common work, multiple copies of that work may be owned by various end users. If the work is manifest in digital form (e.g., eBook), digital rights management (DRM) or other technological features may prevent lending or limit a number of times that the digital copy of the common work may be lent. Thus, unlike paperback or hardback versions of a book, the ability to lend an eBook (or other digital item) may be a limited resource that has a high value because of the scarceness of "lends" associated with the eBook.

Illustrative Architecture

FIG. 1 shows an illustrative architecture 100 of computers and networks in which digital items, such as electronic books (or "eBook"), may be loaned and/or borrowed. A lender 102 interacts with a lender device 104 to consume digital items 106 that the lender 102 has previously purchased or otherwise owns. In this illustration, the lender device 104 is embodied as an electronic book reader device that stores one or more digital items 106 such as eBooks. A lending system 108 may be implemented in whole or in part on the lender device 104. The lending system 108 allows the lender 102 to lend digital items 106 to other users. The lending module 108 is discussed in greater detail below.

The lender device 104 is equipped with wireless or other communications technology to connect with a network 110. The network 110 is representative of any one or combination of multiple different types of networks, such as the Internet, cable networks, cellular networks, wireless networks (e.g., Wi-Fi, cellular, etc.) and wired networks.

A lending broker 112 shown here as a server computer connected to the network 110 may function in facilitating lending of digital items between the lender 102 and other users. The lending system 108 may also be implemented in whole or in part on the lending broker 112. The lending broker 112 may also perform additional functions related to digital items such as online or "cloud" storage of digital items. Similarly, the lending broker 112 may facilitate purchasing of digital items either from an online retailer maintained as part of the lending broker 112 or from another entity.

In implementations in which all of the lending system 108 is maintained on the lending broker 112, all lending and borrowing of digital items may be mediated by communications going through the lending broker 112. In other implementations in which the lending broker 112 is not part of the architecture 100, the lender device 104 and other user devices connected to the network 110 may manage lending and borrowing of digital items through a peer-to-peer arrangement. Other implementations in which various components of the lending system 108 are distributed across the lender device 104, the lending broker 112, and other user devices are also possible.

Other users connected to the network 110 may include multiple borrowers 114. The architecture 100 may include 1-N borrowers shown here as borrower 114(1), borrower 114(2), and borrower 114(N). Each of the borrowers may interact with a borrower device 116 for consuming and borrowing the digital items 106 lent by the lender 102. Any number of electronic devices may be used as the borrower devices 116. In some cases, as illustrated here, the borrower devices 116 may be different than the lender's device 104. Representative borrower devices 116 are illustrated as including another version of a dedicated eBook reader device 116(1), a notebook computing device 116(2), and a portable multi-function communication device 116(N). The notebook computing device 116(2) and the portable multi-function communication device 116(N) are implemented with a reader application to render eBooks, and audio player to play music or sound files, a video player to reproduce movies or videos, or other specialized applications to consume the digital items 106 borrowed from the lender 102.

Although three representative devices are shown, many other devices may be used, including desktop computers, tablets, PDAs, portable media players, entertainment devices, netbooks, gaming consoles, DVD players, media centers and the like. In some cases, the borrower devices 116 are capable of allowing the borrowers 114 to access the lending broker 112 over the network 110, browse various item titles, download samples, order items, receive lent items, authorize payment for items being purchased, and the like. In this manner, the lending system 108 accessed either locally or remotely facilitates purchase, lending and/or borrowing of eBooks and other digital items for the various devices 104 and 116.

All users in this architecture 100 may be both borrowers and lenders. The lender 102 may borrow digital items 106 from one of the borrowers 114 or from another source. The borrowers 114 may also lend digital items 106 to the lender 102 or to another borrower 114. For example, the multiple digital items 106 accessible by the lender 102 via the lender device 104 may include both items that the lender 102 owns, items that the lender 102 is currently borrowing from another, and items that the lender 102 has loaned out to one of the borrowers 114.

The various lending and borrowing transactions between the lender 102, the borrowers 114, and other users not shown here creates a network of relationships and interconnections with each digital item lent. These relationships may be overlaid on network or relationship map established as part of a social network (e.g., links to "friends," users that are "followed" by other users, and the like) and/or the lending and borrowing by itself may connect users in a social network.

Illustrative Social Network

Figure 2:
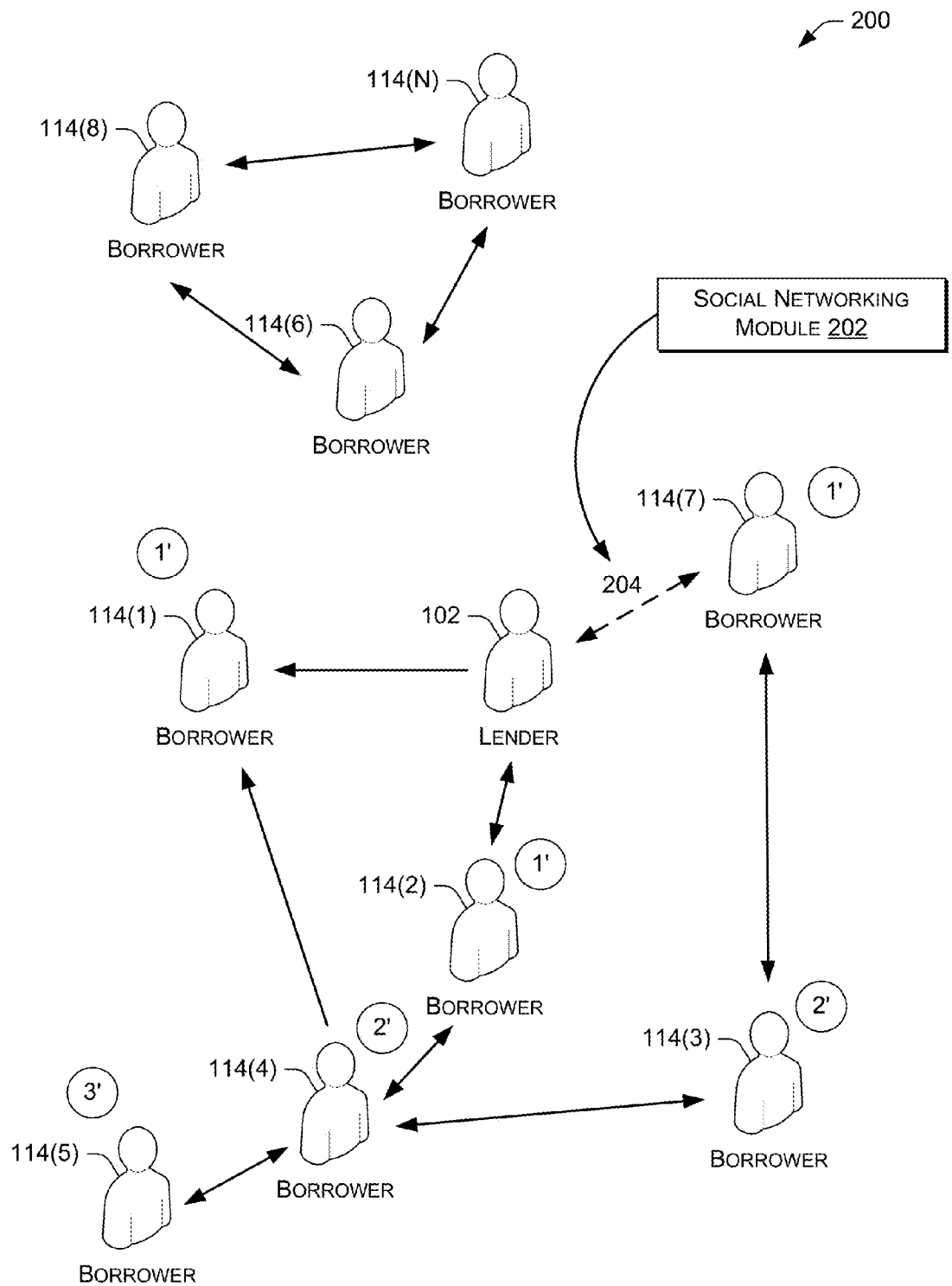
FIG. 2 shows a social network of multiple users that may lend and/or borrow digital items from one another.

FIG. 2 shows a social network 200 of multiple users that may lend and/or borrow digital items from one another. The social network 200 may include the lender 102 shown in FIG. 1 and the multiple other users indicated as borrowers 114(1)-114(N). Although, this view of the social network 200 is centered around the lender 102 and is discussed in terms of the lender 102 lending a digital item to another user in the social network 200, any of the users may be a lender and/or borrower.

In a generalized configuration, the social network 200 comprises nodes (e.g., the lenders and borrowers) and edges between the nodes (e.g., relationships). The edges between the nodes (i.e., the connections between the lender and borrowers) may be directional. Some of the edges may be two-way and some may be one-way.

An example of a two-way edge or relationship may be a "friend" relationship between the lender 102 and the borrower 114(2). An example of a one-way edge or relationship may be a "follower" relationship such as shown between the lender 102 and borrower 114(1). The one-way relationship may indicate that information flows only one way. For example, the lender 102 and borrower 114(4) may receive information from the borrower 114(1) such as lists of digital items consumed or recommended, but the borrower 114(1) may not receive similar information from the lender 102 and the borrower 114(4). Thus, the social network 200 may be formed by a plurality of two-way "friend" relationships and/or one-way "follower" relationships between members of the social network 200. A two-way relationship may also be created by two one-way relationships. For example, borrower 114(4) following borrower 114(3) and conversely borrower 114(3) following borrower 114(4) may create a two-way relationship as shown in the social network 200.

Relationships between the lender 102 and the borrowers 114 in the social network 200 may also be characterized by levels of proximity or separation between the lender 102 and the borrowers 114. Here, users directly connected to the lender 102 (i.e., connected by an edge without an intervening node) are indicated as having primary connections (1'). Users that are connected to a user having a primary connection to the lender 102 are designated as having secondary (2') connections that may be thought of as having a distance of 2. When a user is connected to the lender 102 over multiple paths (e.g., borrower 114(3)) the degree of separation may be determined by the shortest path. Users connected to another user having a secondary connection to the lender 102 have tertiary (3') relationships, with a distance of 3, to the lender 102. Although only three levels of relationships are shown for the sake of simplicity, the social network 200 may include any number of relationship levels.

The degree of connectedness between the lender 102 and one of the borrowers 114 may be used by the lender 102 or by the lending system 108 to choose who receives the loan of a digital item. The degree of connectedness between the lender 102 and one of the borrowers 114 may be determined by the level of proximity or separation and by a directionality of the connection. A two-way relationship may be interpreted as a stronger relationship than a one-way relationship.

In one implementation, the lender 102 may decide that he or she only wishes to lend to immediate friends and therefore limits the potential recipients of a digital item to only those users who have a primary relationship in the social network 200. Alternatively, the lending system 108 may desire to push the lender 102 to expand his or her pool of lending/borrowing partners, and thus, suggest lending a digital item to a borrower 114 that does not have any connected to the lender 102. These "unconnected" borrowers 114 may be part of the same social network 200, but not connected to the lender 102. Alternatively, users that have only an attenuated connection to the lender 102, such as ten degrees or more removed, may be considered "unconnected" to the lender 102.

As discussed earlier, the connections or relationships between the lender 102 and the borrowers 114 in the social network 200 may be preexisting and independent of any lending of digital items. Friends, followers, and the like may be established through a social networking website or other system. The social network 200 relationships may be correlated with digital item lending through usernames, email addresses, etc.

In some implementations, the lending and borrowing activity itself may create the social network 200. For example a social networking module 202 may connect two users in the social network 200 when one lends a digital item to another. Connections may also be formed by borrowing. For example, the connection 204 may be generated by the social networking module 202 in response to the lender 102 lending an eBook to the borrower 114(7). This connection 204 is shown as a two-way connection and that may imply that the borrower 114(7) has also lent an eBook, or other digital item, to the lender 102.

Figure 3:
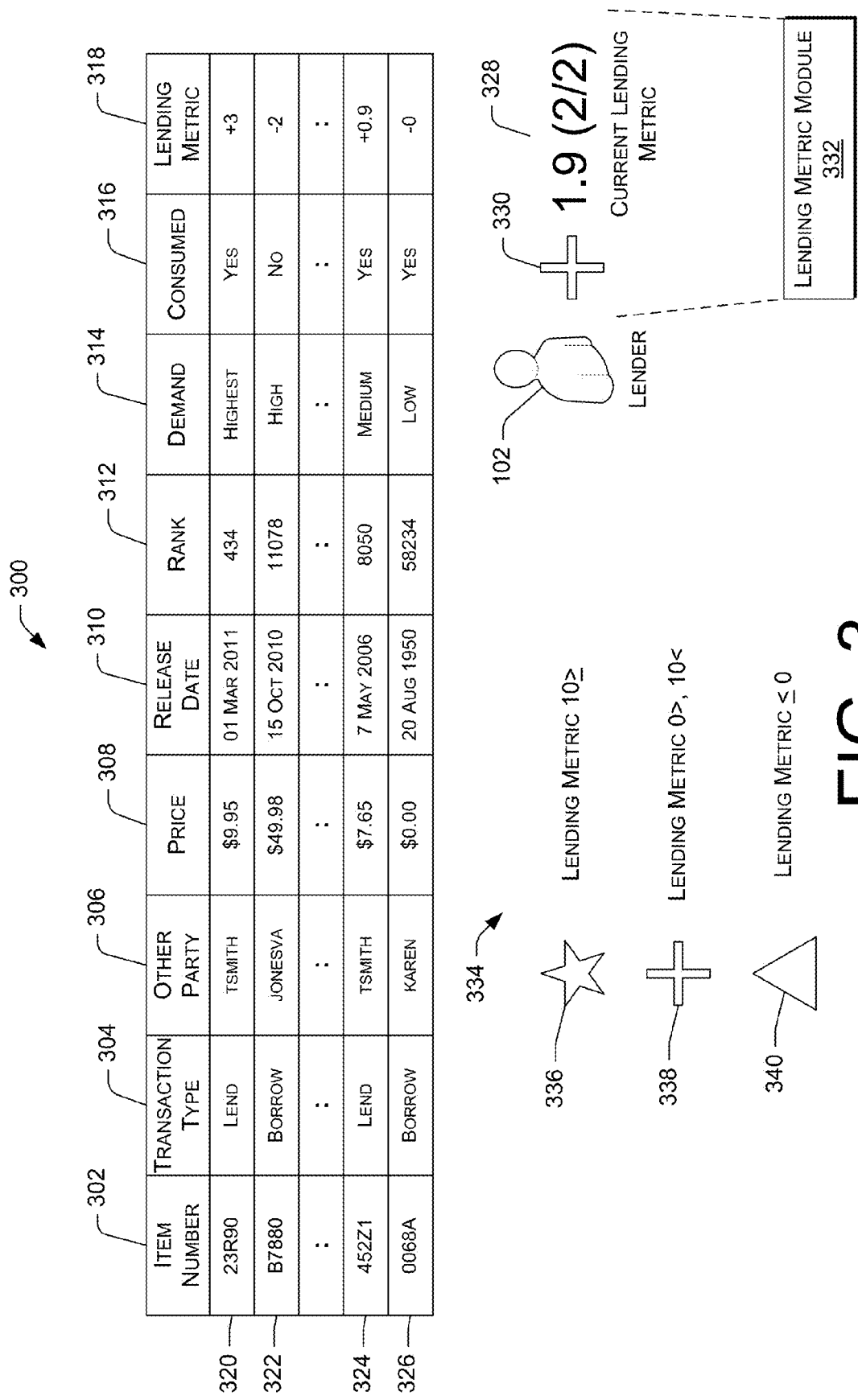
FIG. 3 shows a lending and borrowing history associated with a particular user and representation of a lending metric for that user based upon the lending and borrowing history.

Different subsets of users within the social network 200 may be defined by a shared characteristic. For example, users closest to the lender 102 in the social network 200 may include all those users having a primary connection such as borrowers 114(1), 114(2), and 114(7). Conversely, users that are farthest away from the lender 102 may comprise another subset. In this example that would include the unconnected borrowers 114(6), 114(8), and 114(N). Other types of subsets may include user with a high centrality in the social network 200 (i.e., connected to a large number of other users). Interaction with users having a high centrality may be useful for rapidly spreading information, loaned digital items, advertisements, etc., throughout the social network 200. For example, borrower 114(4) with direct connections to four other users has the highest centrality in the illustrative social network 200. A level of centrality may be represented as a number of primary connections to that user. Additionally, follower/followed relationships may define a subset of users. Thus, the followers of borrower 114(1) (e.g., lender 102 and borrower 114(4)) may be a subset of users Illustrative Lending and Borrowing FIG. 3 shows a lending and borrowing history 300 associated with a particular user and representation of a lending metric for that user based upon the lending and borrowing history 300. The lending and borrowing history 300 is shown in FIG. 3 as a table with rows representing lending or borrowing transactions of a digital item and columns representing characteristics associated with or derived from those transactions. However, this is merely an illustrative data structure and any other technique for storing or organizing similar data is also possible.

Each digital item may be identified by an item number 302 or other type of unique identifier. Digital items such as eBooks may be identified by an international standard book number (ISBN). A transaction type 304 of either lending or borrowing is associated with each entry in the lending and borrowing history 300. The other party 306 to the transaction (i.e., the user that borrows the digital item or the user that lends the digital item) is recorded as a user name or other identifier. Tracking of the other party 306 to lending and borrowing transactions can reveal patterns and relationships such as frequent lending and borrowing between two users. It can also be analyzed to determine a number of unique recipients (i.e., different users) for loans originating from a user.

Information about the digital item itself may be contained in the lending and borrowing history 300. This information may include a price 308, a release date 310, a rank 312 either through user popularity, reviews, and the like, and a level of demand 314. The demand 314 may be determined based on how many users wish to borrow this digital item and how many copies are available to lend.

Each transaction in the lending and borrowing history 300 may also indicate whether or not the digital item was consumed or not by a lender at the time the digital item was loaned. When a lender purchases a digital item and lends it to another before he has consumed it himself, that loan may be assigned a greater value or significance than the loan of a digital item that the lender has already consumed. In the borrowing history 300, transaction records for the digital item 322 show "no" in the consumed 316 column indicating that the other party 306 (i.e., JONESVA) lent this item before consuming it herself. Consumption may be detected by the lender device 104 or other device for consuming digital items.

Ultimately, each borrowing or lending transaction may be assigned a lending metric value 318. The lending metric may represent the net effect of lending or borrowing on the community of users able to lend and borrow digital items. Contributions to the community or activities that generally increase the flow of loaned digital items may be associated with a positive number. Gifting a digital item to another user, as opposed to merely lending, is one example of an activity that contributes to the flow of digital items between users. Giving a digital item as a gift may earn the "gifter" a larger increase in his or her lending metric that lending that same digital item. Other activities that detract or consume digital items that are available to be loaned may be represented as a negative number. In a basic example, lending a digital item may be associated with +1 lending metric and borrowing may be associated with −1.

Thus, the lending metric may be thought of as a type of "goodwill" or positive "karma" that is increased by lending and decreased by borrowing. This metric may serve many purposes within a lending/barring community such as the social network 200 shown in FIG. 2. For example, a user may be incentivized to lend more by a desire to obtain a higher lending metric. Additionally, various rewards or benefits may be provided to those with high lending metrics. Those users that primarily borrow without lending (e.g., "leeches") may also be readily identified by their lending metric.

In this example, the first transaction 320 is the loan of a digital item with the item number 23R90. This may represent one of the digital items 106 shown in FIG. 1. The net change to the lending metric value 318 for this transaction is +3. Although lending one digital item may be assigned a default value of +1, various characteristics associated with the digital item or the circumstances of the loan may modify the lending metric value 318. Here, the lending metric value 318 may be increased from +1 to +3 in part because of the recent release date 310, in part because of the relatively high rank 312, and in part because this digital item is experiencing the highest level of demand 314. For example, the digital item 23R90 may be a new and popular novel released as an eBook.

The second transaction 322 shown in the lending and borrowing history 300 represents borrowing a digital item. This item is notable for its relatively high price 308 and high demand 314. Also, the other party 306 loaning this item, noted here as JONESVA, has not yet consumed 316 this digital item. For example, this digital item may be a collection of movies. For this transaction, the net change to the lending metric value 318 for the user is −2. The baseline change of −1 is increased, made more negative, due in part to the high price 308, and in part to the high demand 314. The lending metric value 318 may also be changed more because the lender has not yet viewed the movie collection as represented by the "no" in the consumed column 316.

The next transaction 324 represents the loan of a digital item to the other party 306 TSMITH that also received a loan of a digital item in transaction 320. Since this loan is not to a unique recipient, the amount the lending metric value 318 is increased may be less than +1 shown here as an increase of only +0.9. Those the modification of the lending metric may be bias to encourage lending to many different borrowers.

The final transaction 326 shown in this illustrative lending and borrowing history 300 represents borrowing a digital item that the lender (i.e., KAREN) obtained for free. For example, this may be a digital version of an older magazine that is now available in the public domain. Alternatively, the free item may be something that other users pay for, but the user KAREN obtained for free such as a promotional copy. The loan of a free item may be considered a less valuable transaction than the loan of an expensive item, particularly an expensive digital item that may only be loaned a limited number of times. Thus, in some implementations, transactions involving free items may be excluded from determining a number of loaned and borrow digital items, and thus, assigned a lending metric value 318 of zero. The lending metric value 318 for this transaction is shown as −0, wherein the negative may show that this is a borrowing transaction and differentiate it from +0 associated with lending a free digital item. Although only a few examples are provided herein, any combination of weighting and consideration of the various transaction characteristics 302-316 may be used to derive a lending metric value 318 for a given transaction.

The totality or summation of the lending metric values 318 from the purchase and lending history of a given user may be represented as a single current lending metric 328. Here, the current lending metric 328 is shown as associated with the lender 102. One technique for calculating the lending metric 328 associated with a user (as opposed to the lending metric value 318 associated with a transaction) is the difference between the number of digital items lent by the user minus the number items borrowed by the user. Thus, the user that lent 4 items and borrowed 2 items would have a lending metric 328 of 2. Similarly, lending 102 items and borrowing 100 items would also result in a lending metric of 2.

As evidence from the above example, giving lending and borrowing equal weight may lead to the same lending metric 328 for frequent lenders and borrowers as well as for infrequent lenders and borrowers. To promote and to recognize high levels of participation in a lending and borrowing community the amount the lending metric decreases when a digital item is borrowed may be less than the amount the lending metric increases when a digital item is lent. Lending may be "rewarded" more than borrowing is "penalized." For example, lending one eBook may lead to an increase of +1 in a user's lending metric 328, but borrowing one eBook may decrease the user's lending metric 328 by only −0.9. Thus, the user that has lent 4 items and borrowed 2 items would have a lending metric 328 of 2.2. However, the user that lent 102 items and borrowed 100 items would have a lending metric of 12. With the differential weighting of lending and borrowing it is not only the net difference between loans and borrows but also the total number that determines a user's current lending metric 328.

The current lending metric 328 associated with a user such as the lender 102 in this example, may be shown only to the lender 102 or it may be presented to other users in a profile of the lender 102. By exposing the current lending metric 328 to others, peer pressure may provide an additional incentive to lend digital items. In some implementations, the lender's 102 lending metric 328 may be shown only to other users connected to the lender 102 in a social network and not shown to users that are not connected to the lender through the social network. For example, in the social network 200 shown in FIG. 2, each of the borrowers 114(1)-(5) and 114(7) that are connected to the lender 102 are able to view the lender's 102 lending metric 328, but the borrowers 114(6), 114(8), and 114(N) are not able to view the lending metric 328. Different levels of privacy and public dissemination of a lending metric are also possible.

Presentation of the current lending metric 328 may also include presenting the number of digital items lent by the user and the number of the items borrowed by the user in addition to the net lending metric 328. For example, the lending and borrowing history 300 with the weighted lending metric values 318 results in a net lending metric 328 of 1.9. When displayed to the lender 102 or other users the current lending metric 328 may also show that 2 digital items were loaned and 2 digital items were borrowed.

Presentation of the lending metric 328 may also include presentation of a non-numeric representation 330 of the lending metric 328. Here, a plus sign is shown as the non-numerical representation 330 of the lending metric 328. Both the calculation of a current lending metric 328 and options for display or presentation of that lending metric 328 may be implemented by a lending metric module 332 that is part of the lending system 108 shown in FIG. 1.

The non-numerical representation of the lending metric 328 may take any form such as a badge or icon associated with a user profile. In some user interfaces, the non-numerical representation 330 may be a sound. The non-numerical representation 330 may be based on the numerical value of the lending metric 328. For example, table 334 shows correspondence between icons and corresponding numerical values for lending metrics. Lending metrics 328 of 10 or greater may be indicated by a star 336. Lending metrics greater 328 more than 0 and less than 10 may be represented by a plus sign 338. Lending metrics 328 less than or equal to 0 may be represented by a triangle 340.

Figure 4:
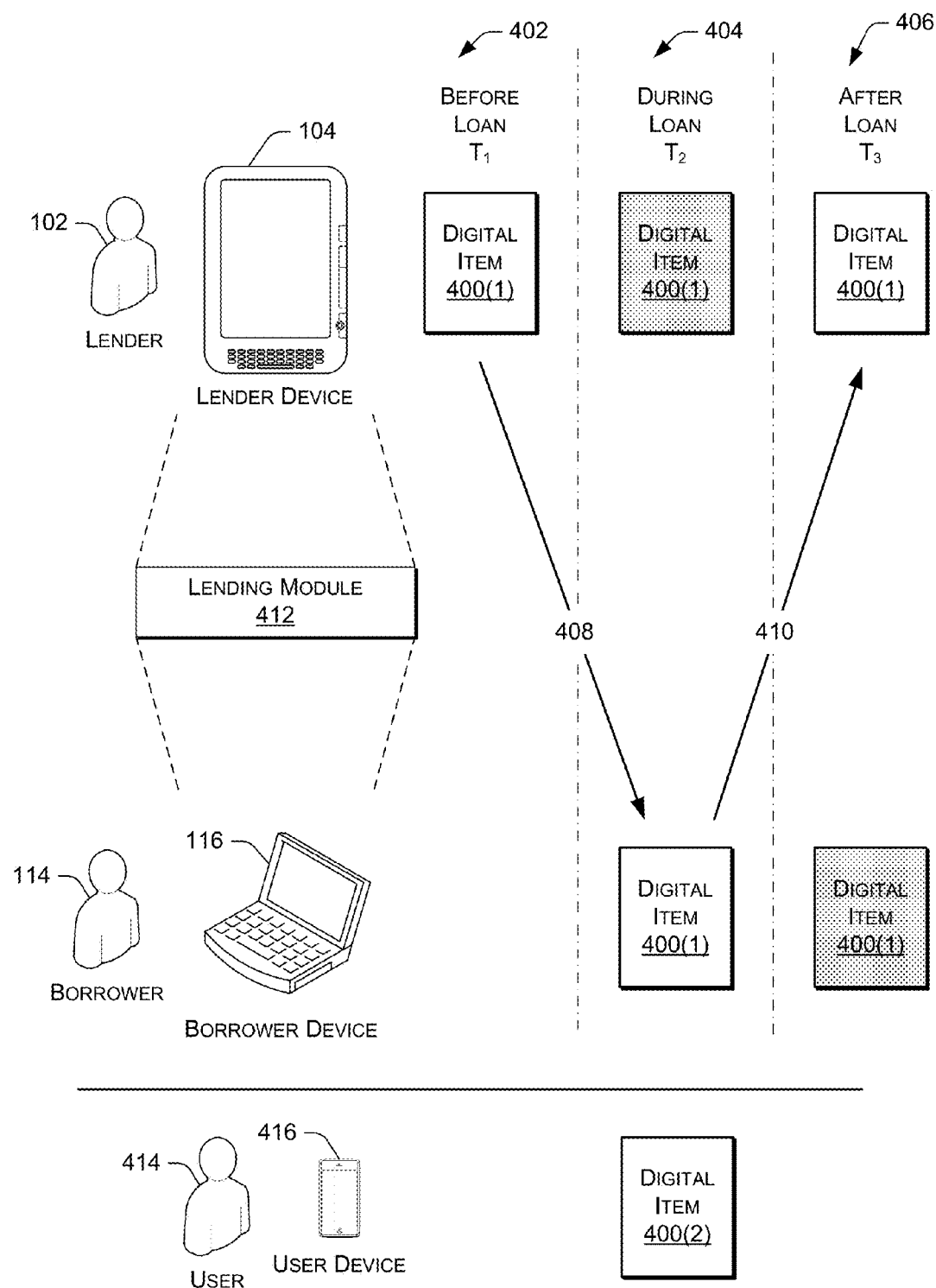
FIG. 4 illustrates the loan of a copy of a digital item from a lender device to a borrower device.

FIG. 4 shows illustrates the loan of a copy of a digital item 400 from the lender device 104 to the borrower device 116. Before the loan 402 at a time point $T_1$ a first copy of the digital item 400(1) is present on the lending device 104. During the loan 404 at time point $T_2$ the digital item 400(1) is present on the borrower device 116. After the loan 406 at time point $T_3$ the digital item 400(1) is again available for consumption on the lender device 104.

Transfer of data representing the digital item 400(1) itself, or of rights to access this copy of the digital item 400(1), is represented by arrows 408 and 410. Transfer of the digital item 400(1) and mediation of the terms of the loan may be managed by a lending module 412 found in the lending system 108.

During the loan 404 at time point $T_2$ the copy of the digital item 400(1) may remain on local memory of lender device 104, but be deactivated so that the lender 102 is prevented from consuming this copy of the digital item 400(1) during the duration of the loan to the borrower 114. Alternatively, the transfer represented by arrow 408 may delete the digital item 400(1) from the lender device 104. Thus, in some implementations, the lender 102 may not be able to access the digital items that are being loaned out. In other implementations, the lender 102 may retain limited or unlimited rights to access the digital items while they are being loaned.

Return of the copy of the digital item 400(1) to the lender device 104 may be implemented by transferring data corresponding to the copy of the digital item 400(1) back to the lender device 104 as shown by arrow 410. Alternatively, the inactivated copy at $T_2$ 404 may be reactivated. In some implementations a deactivated or inaccessible copy of the digital item 400(1) may remain on the borrower device 116. Thus, when the borrower 114 later purchases his own copy of the digital item 400, access may be quick without any download latency because only an access code, DRM token, or the like needs to be transferred to the borrower device 116.

Digital items, unlike tangible items such as paperback books, may only be eligible for lending a limited number of times. Some digital items may be lendable only once ever. Borrowing may also be restricted, for example a given user may only be able to borrow a digital item once from any source and then is prevented from borrowing that same digital item in the future. Other digital items may be able to be loaned or borrowed more than once or even an unlimited number of times. The number of times the digital item can be loaned or borrowed may be enforced by the lending module 412 through the use of DRM or similar technology to prevent copying or transfer of data from one device to another. The owner of a particular copy of a digital item may choose to limit the number of times that the digital item may be lent.

The limited number of times that he digital item can be lent or borrowed may also be specified by an entity having rights in the digital item. This "rights holders" may include at least an author and/or a publisher. In general, a rights holder may be any person or entity that holds or has rights to reproduce, distribute, import, export, create derivatives, perform or display publicly, sell or transmit the content. In some instances, there may be more than one rights holder for the content (e.g., a publisher may have rights to distribute the content in certain countries, while the author retains the rights to distribute the content in other countries; or publisher A may have the rights to distribute a book in printed form and publisher B may have the rights to distribute a book in eBook form). Examples of rights holders for various types of digital content include, but are not limited to, authors, publishers, music labels, movie studios, artists, songwriters, performers, heirs, and delegates.

The ability of a rights holder to specify a number of times that a digital item can be lent may lead to different pricing for copies of a digital item depending on how many "loans" are purchased with the digital item. For example one copy of the digital item 400 owned by the lender 102, copy 400(1), may have been purchased for $12.95 and be able to be loaned once. However, another copy of the same digital item 400 owned by user 410 and stored on user device 412, copy 400(2), may have been purchased for a lower price of $9.99, but not include the ability to loan this copy 400(2). While every copy of digital item 400 may be the same in that each contains the same content (e.g., same text, same audio, same video, etc.) each copy is also distinct in that some copies may be lendable while others may not.

Thus, the ability to loan a digital item and being granted permission to borrow a digital item may be valuable commodities that can be brokered in a marketplace and even monetized. For example, the value of borrowing a copy of digital item 400 may be based the on difference in prices of a lendable, 400(1) for $12.95, and non-lendable, 400(2) for $9.99, versions of the digital item 400.

In some scenarios, the lender 102 may loan digital item 400(1) for either a finite period or unlimited time to the borrower 114. When initiating a loan of the digital item 400 (1) the lender 102 may interact with a user interface (UI) on the lender device 104. The lending UI may include an entry box in which the lender 200 may enter an identity of the party to whom the digital item 400(1) is being loaned (e.g., borrower 114). The lending recipient may be identified by an email address, although other conventions may be employed (e.g., person's name, account number, personal identifiers, etc.). The UI may also include options for specifying a duration of the loan. The options may permit selection of a finite period such as a number of days to loan the item, or an indefinite period. Other options may be presented, as well as other duration units (e.g., hours, weeks, months, etc.). Upon expiration of the predetermined loan, the lending module 412 may automatically prevent the borrower 114 from accessing the digital item 400(1) on the borrower device 116. Thus, unlike a conventional book there is no need to repeatedly ask a friend to return a loaned eBook. In some implementations, the borrower 114 may receive a warning indication when the end of the loan period is drawing near.

Illustrative Lists of Digital Items

Figure 5:
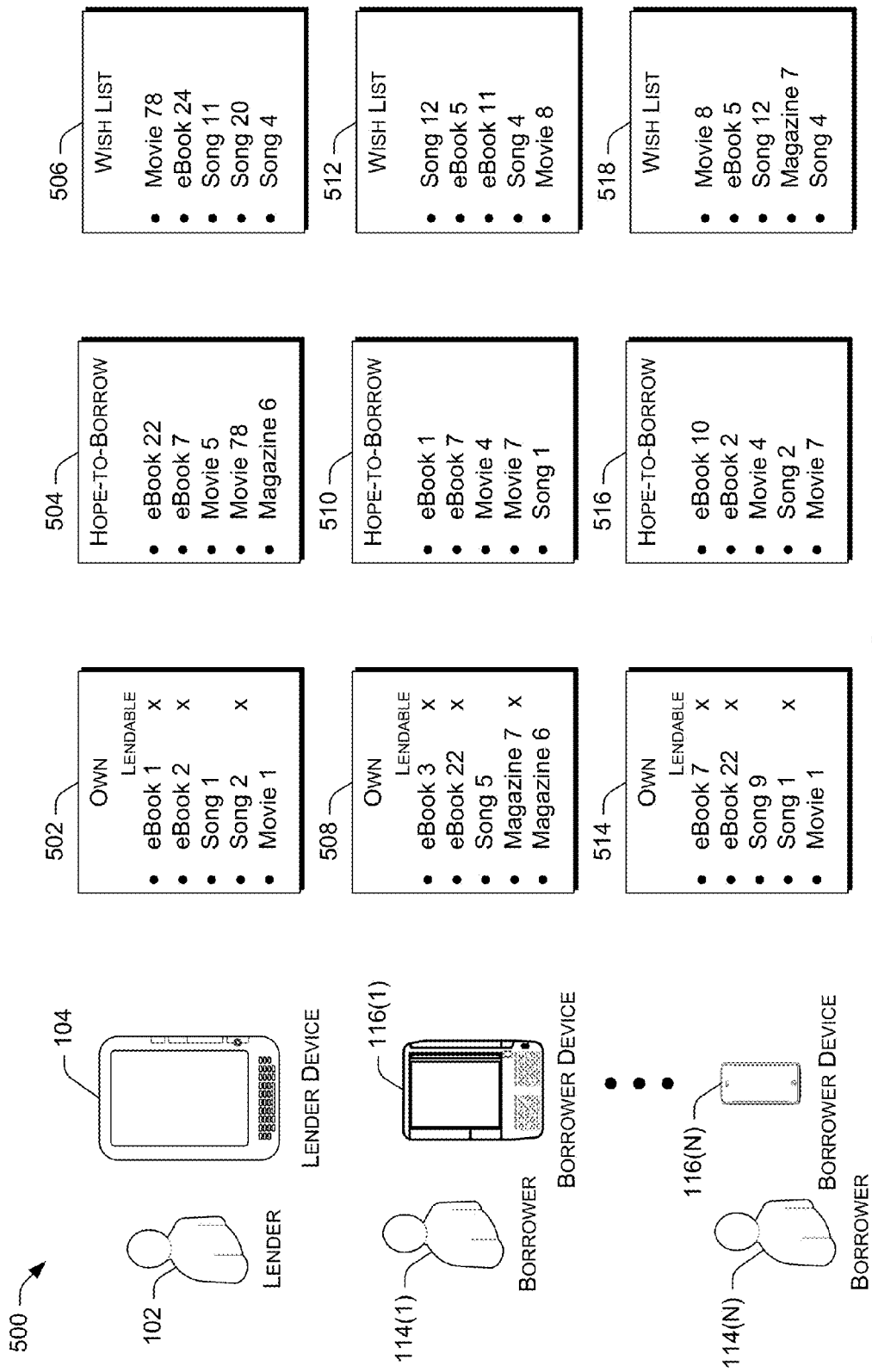
FIG. 5 shows multiple lists of digital items associated with different lenders and borrowers.

FIG. 5 shows multiple lists 500 of digital items associated with different lenders and borrowers. The lender 102 is associated with a list of digital items that he or she owns 502, a list of digital items that he or she hopes to borrow 504 and a wish list 506 of digital items that he or she hopes to purchase or perhaps receive as gifts. Other users shown here as the borrower 114(1) and the borrower 114(N) may also be associated with their respective lists.

The list 502 of digital items owned by the lender 102 includes two eBooks, two songs, and one movie. Digital items may be stored on the lender device 104 or stored elsewhere such as in the "cloud" and accessible by the lender device 104. Each of the digital items may be lendable as indicated by an "x" next to the name of the digital item. For example, eBook 1, eBook 2, and song 2 are all lendable.

The second list 504 of the items that the lender 102 hopes to borrow includes items that are desirable enough to the lender 102 he or she wishes to borrow them but they are not digital items that lender 102 necessarily wishes to purchase or own. This illustrative list 504 includes two eBooks, two movies, and one magazine.

The third list 506 shown here is a wish list of digital items that the lender 102 wishes to purchase or otherwise own. The wish list 506 includes one movie, one eBook, and three songs. Analysis of the digital items included in these lists may provide inside them to the tastes and consumption patterns of the lender 102. The lists of items that are owned 502 and of items that the lender 102 hopes to borrow 504 may also facilitate matching lenders and borrowers with one another.

The borrower 114(1) also has associated lists of owned digital items 508, lists of digital items he or she hopes to borrow 510, and a wish list 512. Inclusion of a digital item such as eBook 1 into the hope to borrow list 510 may allow the lending system 108 to infer that the borrower 114(1) is requesting a loan of eBook 1. Fortunately for the borrower 114(1), the lender 102 has a lendable copy of eBook 1.

The borrower 114(1) also has a lendable copy of eBook 22 which the lender 102 hopes to borrow. Therefore, these two users may loan the respective digital items to one another. By trading "loans" users may be incentivized to lend a digital item because that allows borrowing of a desired digital item.

An additional user, borrower 114(N) also has associated lists of owned digital items 514, digital items that he or she hopes to borrow 516, and a wish list 518. The list of items owned 528 by borrower 114(N) includes a lendable copy of song 1. This is different from the copy of song 1 owned by the lender 102 because the copy owned by the borrower 114(N) still has the ability to be loaned to another. Thus, the borrower 114(1) may differentiate between the lender 102 and the borrow 114(N) because, although both own a copy of song 1, only the borrower 114(N) is able to lend that song.

If there are multiple other users for which a single item match exists (e.g. loan of one item in return for being allowed to borrow one item) the lending system 108 may select a lending or exchange partner based on the ability to exchange a third digital item for a fourth digital item. For example, the lender 102 owns lendable copies of eBook 2 and song 2 which are both included in the hope to borrow list 516 of the borrower 114(N). Borrower 114(N) in turn owns lendable copies of eBook 7 and eBook 22 which the lender 102 hopes to borrow. Although all four of the digital items need not be exchanged at one time, the ability to make further matches in the future makes a borrower 114(N) a more attractive exchange partner for lender 102 than borrower 114(1).

Although the wish lists 506, 512, and 518 contain digital items that the respective users hope to purchase, inclusion of an item in one of the wish lists 506, 512, and 518 may be interpreted as an indication that the user desires to borrow the digital item. For example, inclusion of magazine 7 in the wish list 518 of borrower 114(N) may lead to lending of a copy of magazine 7 owned by borrower 114(1) to borrower 114(N).

Similarity of consumption patterns between two different users may suggest that those two users could be lending/borrowing partners in the future. Users with similar tastes and consumption patterns of digital items may be more likely to own, or later obtain, a digital item one of the other users hopes to borrow. For example, comparison of the similarity of digital items in the hope to borrow list 504 of the lender 102 with the hope to borrow lists 510 and 516 may show greater similarity between the lender 102 and borrower 114(1) because both users include eBook 7 in their respective hope to borrow lists 504 and 510.

Illustrative Lending System

Figure 6:
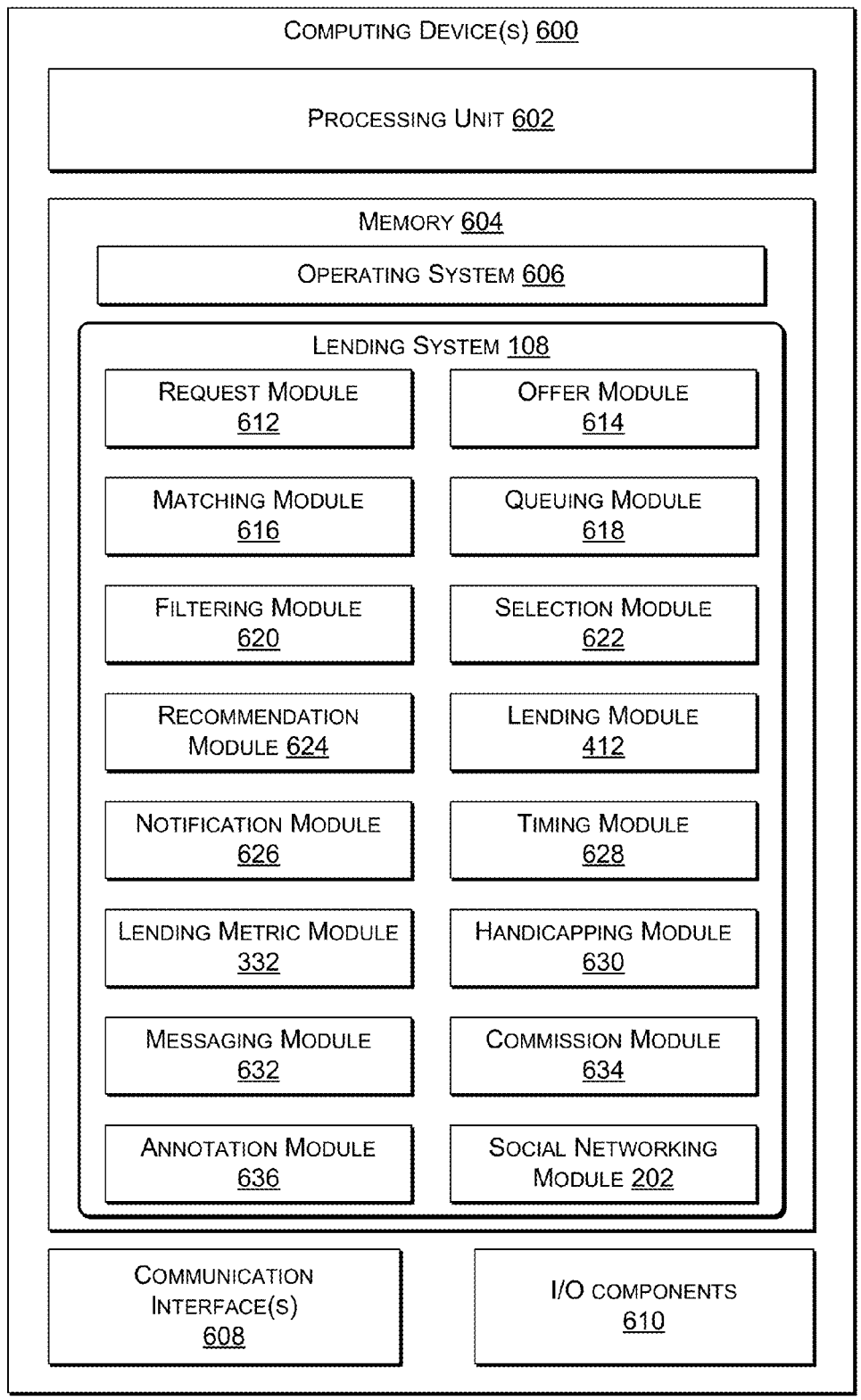
FIG. 6 is a block diagram illustrating selected modules in the computing systems employed in the various devices and architectures of FIGS. 1-5.

FIG. 6 shows selected modules in a representative computing device 600 that may be used to functionally support practices of lending and borrowing digital items, as described above with respect to FIGS. 1-5. The computing device 600 may represent any of the lender device 104, the lending broker 112, and/or the borrower device 116 shown in architecture 100. In a basic configuration, the computing device 600 includes a processing unit 602 and a memory 604.

The memory 604 is an example of a computer-readable storage medium and may include volatile and nonvolatile memory and/or removable and non-removable media implemented in any type or technology for storage of information, such as computer-readable instructions, data structures, program modules or other data. Such memory includes, but is not limited to, RAM, ROM, EEPROM, flash memory, CD-ROM, digital versatile disks (DVD) or other optical storage, magnetic cassettes, magnetic tape, magnetic disk storage or other magnetic storage devices, RAID storage systems or any other tangible medium which can be used to store the desired information and which can be accessed by a computing device. The memory 604 may store an operating system 606 and the lending system 108 introduced in FIG. 1.

The computing device 600 may also include one or more communication interfaces 608 to facilitate communication with external, remote computing sources over various networks such as network 110 or with other local devices. The communication interface(s) 608 support both wired and wireless connection to various networks, such as cellular networks, radio, Wi-Fi networks, short range networks (e.g., Bluetooth), infrared (IR), and so forth. The communication interface(s) 222 are one example of communication media. Communication media may typically be embodied by computer readable instructions, data structures, program modules, or other data in a modulated data signal, such as a carrier wave or other transport mechanism. Communication media is to be distinguished from computer-readable storage media.

The computing device 600 may further be equipped with various input/output (I/O) components 610. Such components may include various user interface controls (e.g., touch screen(s), buttons, joystick, keyboard, etc.), a display, audio speaker, a microphone or audio input, connection ports, and the like.

The lending system 108 stored in the memory 604 includes one or more modules that are executable by the processing unit 602 to facilitate various aspects of lending digital items to other users. Components and modules of the lending system 108 may be located all on a single device or spread across multiple devices such as the lender device 104, the lending broker 112, and one or more borrower devices 116.

A request module 612 in the lending system 108 receives a request from a user to borrow a digital item. The request may be an explicit indication by the user (e.g., checking a "lend to me" box next to the title of a digital item) or an implicit indication inferred by the request module 612. For example, the request may be inferred by the request module 612 when the user includes the digital item in a list of multiple digital items such as a hope-to-own list or a wish list like those shown in FIG. 5.

As well as soliciting digital items to be loaned, the lending system 108 may also support solicitation of borrowers for a digital item with an offer module 614. The offer module 614 may generate an offer to lend a digital item. The offer may be available only for a limited time, and thus, the offer may include a time period for indicating acceptance of the offer. The offer module 614 also sends the offer to a plurality of potential borrowers. The time period for accepting the offer may be specified by an owner of the digital item to wishes to lend. For example, an owner of digital item may request responses from other users interested in borrowing the digital item during a one hour or one day window of time.

The offer may be sent only to potential borrowers that the owner of the digital item explicitly designates. For example these potential borrowers may be friends of the owner of the digital item connected through a social network such as shown in FIG. 2. The offer itself may be sent by e-mail or any other communication means including being sent through communication channels established in the social network.

A matching module 616 in the lending system 108 may assist a first user to find a second user who wishes to borrow something from the first user and you have something that the first user wishes to borrow in return. The matching module 616 a function by receiving an indication from a user of a first digital item that the user desires to borrow and one or more second digital items to lend. Based on this information, the matching module 616 may identify matching users that have the first digital item to lend and a desire to borrow one of the one or more second digital items.

In some situations there may be more users that desire to borrow a particular digital item than there are copies of that digital item to lend. In such situations, the lending system 108 may use a queuing module 618 to maintain a waiting list for loaned copies of the digital item. The queuing module 618 may place a request received from the request module 612 into a queue to receive a loan of the requested digital item. A default behavior of the queuing module 618 may be first-in-first-out so that users in a queue receive a loan of the digital item in the order that each user entered the queue.

The queuing module 618 may also prevent certain users from even obtaining a place in the queue. For example, a user that has a lending metric less than a threshold level may be prevented from placing a request in the queue. A lending metric requirement to enter a queue for popular digital items may serve as an additional incentive to lend rather than only borrow digital items. The queuing module 618 may also modify the position of in the queue of a request from a user based on the lending metric associated with that user. This may allow users with a higher lending metric to move up the queue faster and it may also keep lenders with a lower lending metric towards the bottom of the queue. In some implementations, when the user has a lending metric that is more than a threshold level the request from the user may move to the top the queue and the user will become the next person to receive a loan of the digital item. This type of priority treatment may be a kind of reward for those users that contribute by lending a high number of digital items to other users.

In addition or instead of placing all of the potential borrowers in a queue, all possible recipients for the loan of a digital item may be filtered based on some number of characteristics to reduce the number of users competing to borrow the digital item. This filtering may be implemented by a filtering module 620. For example, when there are multiple users that have items to lend as well as items that each desires to borrow, represented here by the lists shown in FIG. 5, there may be multiple matches between the user pairs. The filtering module 620 may assist the users in deciding who to "pair up" with by identifying one of the multiple users that has matching lending and borrowing desires as an exchange partner based on characteristics of each of the matching users.

The characteristics may be specified by the user, or lender, that initiates a search for an exchange partner or by the lending system 108. When the lending and borrowing occurs between users that are members of a social network, the proximity of the user and the matching users in the social network may be used to identify exchange partners. For example, matching users having a closer proximity in the social network may be preferred exchange partners over those with a more distant relationship. From the perspective of the lender 102 as shown in FIG. 2, one of the borrowers with a primary connection may be a preferred exchange partner rather than one of the borrowers at a secondary, tertiary, or greater level of distance from the lender 102. Conversely, the lending system 108 may be biased to introduce users to others that are outside of the immediate social group and thus prefer making matches with other users whose proximity in the social network is low.

Other characteristics besides social network distance such as actual geographic distance between the users may be considered when the filtering module 620 assists in making a match. For example, data associated with the users such as an address may be stored as part of a user profile. All of the actual addresses may not be revealed to other users, geographic proximity may be used if one of the users wants to exchange digital items with another user of the lending system 108 who happens to live in the same city, state, country, etc.

The filtering module 620 may also filter potential matches or exchange partners for loans of digital items based on lending metrics associated with each of the matching users. This filtering may be initiated by the first user seeking an exchange partner but desiring to avoid loaning to someone who primarily borrows and has a low lending metric. Similarly, the lending system 108 operating automatically to filter possible matching users, may select the user with the highest lending metric out of two users that are equally good matches based on other characteristics. Thus, this may be another way to incentivize and reward behavior that leads to an increase in a lending metric.

Additionally, a selection module 622 may function similar to the filtering module 620 in that both modules assists in selecting one user from a plurality of potential borrowers. The selection module 622 determines characteristics associated with each of the plurality of potential borrowers that respond to an offer to lend a digital item. If the offer is time-limited (e.g., only responses received within the first hour are considered) only potential borrowers that respond during the time period are considered and those who responded late may be ignored or informed that the period for responding has ended.

Once characteristics have been determined for each of the timely responders, the selection module 622 may select one of the potential borrowers to lend the digital item based on the characteristics of each of the potential borrowers.

The characteristics considered by the selection module 622 may be the same or similar to the characteristics considered by the filtering module 620. For example, the characteristics may include a lending metric of the potential borrowers, a degree of association with the owner of the digital item in a social network, a geographic distance, and the like. Any characteristic or combination of characteristics that are discernible from a user profile may be used such as age, gender, number of digital items owned, type of device on which digital items are consumed, etc.

After a "best" potential recipient for the loan of a digital item has been identified by one of the techniques above, the loan may be implemented automatically or the option to loan to this "best" recipient may be presented as a recommended option to the lender. The recommendation may be generated and delivered by a recommendation module 624. The recommendation may consist of a message (e.g., text, pop-up window, etc.) that, for example, suggests lending eBook 22 to user TSMITH. The recommendation module 624 may also generate a user interface that allows for acceptance and implementation of the recommended loan.

In situations of matching loans, where the loan of one digital item is reciprocated by being lent a different digital item, the recommendation module 624 may generate a recommendation to borrow the first digital item from the identified exchange partner and lend the digital item desired by the exchange partner to that exchange partner. The recommendation module 624 may also provide multiple options. For example, the lender 102 as shown in FIG. 5 may be given the options of lending eBook 1 to borrower 114(1) and receiving a loan of eBook 22 or lending eBook 2 to borrower 114(N) and receiving eBook 7 in return.

The actual transfer of data from one device to another or transfer of rights to access a digital item is implemented by a lending module 412. The lending module 412 facilitates lending a digital item to a selected one of a plurality of potential borrowers. When a user loans a digital item, the lending module 412 collects data pertaining to the transaction. The data includes an identity and metadata of the digital item, identities of the lender and recipient, identities of the electronic devices used by the lender and recipient, and duration of the loan.

The lending module 412 may also play a role in establishing and/or enforcing digital rights management. For instance, lending module 412 may dictate and enforce what access rights the lender retains for the digital item that is on loan to another user. In one implementation, the digital item may be temporarily removed from the lender device 104 and transferred to the borrower device 116 or alternatively transferred to the lending broker 112. In another implementation, the digital item may be retained on the lender device 104, but disabled from use. In still other implementations, the digital item may be fully or partially accessible to the lender 102 even while it is on loan.

If the user hoping to borrow a digital item has been waiting in a queue, the lending module 412 may provide the user with access to the digital item when the request from the user reaches the top of the queue. Also, for lending/borrowing transactions that are an exchange between two users, the lending module 412 facilitates lending the first digital item from the exchange partner to the user and lending the desired one of the second digital items from the user to the exchange partner.

User is waiting in a queue to borrow a digital item may also wish to know their position in the queue and approximate length of the wait. This information may be provided by a notification module 626 that notifies users of the position of their loan request in the queue and of a number of other user requests in front of them in the queue. The position in the queue may be based on the number of users waiting to borrow a particular digital item and the number of lendable copies of the digital item that are available. For example, dividing the number of requests in the queue by the number of lendable copies may determine an effective queue position. Thus, being 100th in a queue to borrow one of 10 copies may be the same as being 10th in a queue to borrow digital item for which only a single copy is available.

The notification module 626 may also estimate an amount of time until the request from the user reaches the top of the queue. This estimate may be based upon average times it takes a user in general to consume the digital item and/or more specific information about consumption speeds of the users earlier in the queue. The time estimate may be more relevant than a number of users earlier in the queue. For example, having a request that is 50th in line to listen to a three-minute-long song may actually be a shorter wait than being 2nd in line to borrow a two-hundred page eBook.

The estimated amount of waiting time may also be based on the actual progress of the user or users consuming the digital item. For example, if the digital item is an eBook, then the estimated wait time for users in the queue may decrease as the current borrower gets closer to the end of the eBook.

Users consuming a borrowed digital item, whether additional users are waiting in a queue for the same item or not, may be allowed to borrow that digital item only for a limited amount of time. This time limitation may be similar to the limits imposed by a library lending conventional books or a video shop lending movies.

A timing module 628 may assist in monitoring and regulating the creation that a borrower has access to a loaned digital item. The timing module 628 may also determine a consumption rate of the digital item based on the rate that the user has consumed to the digital item thus far. For example, if the user has read 100 pages of an eBook in four days, the consumption rate is 25 pages per day. The consumption rate may also be based on the users past consumption rate for different but similar digital items. For example, the timing module 628 may have previously determined that the user typically reads textbooks at the rate of 10 pages per day.

The timing module 628 may also include forecasting features that can determine if the user is likely to consume the entire digital item before expiration of the predetermined time period for the loan. Based on the amount of the digital item remaining, the amount of the loan period remaining, and the user's consumption rate, the timing module 628 may predict the likelihood that the user will finish the digital item in time. If it appears likely that the user will not finish the digital item during the duration of the loan, the timing module 628 may generate a warning or other type of indication for the user indicating that the user will probably not consume the entire digital item before expiration of the predetermined time period.

This indication may include notification of a consumption speed that is sufficient to consume the entire digital item before expiration of the predetermined time period. For example, the timing module 628 may divide the quantity of the digital item remaining to be consumed (e.g., pages of an eBook yet to be read) by the number of days left in the loan period to derive a recommended consumption speed (e.g., pages per day). The possibility that a user may be in the middle of a digital item when his or her access to the item expires also presents a marketing opportunity. Thus, the indication generated by the timing module 628 may additionally include an offer to buy a copy of the digital item and possibly present a convenient UI for consummating the purchase. In some implementations, the indication which includes an offer to buy the digital item may further include a discount or coupon that allows the borrower to purchase the digital item at a reduced price.

The changes to lending metrics associated with lenders and borrowers of digital items are tracked and modified by a lending metrics module 332. As explained above, the lending metrics module 332 increases the lending metric associated with a user when the user lends a digital item to another and decreases the lending metric associated with the user when the user receives access to a borrowed digital item. The amount of increase or decrease may depend on any one or combination of characteristics of the digital item. For example, the price, rank, rating, and level of demand associated with a digital item made all effect the change in lending metric that accompanies borrowing or lending that item. Generally, more expensive, more desirable, higher ranked, and digital items for which is a greater demand are associated with a greater change in lending metric. In other words, a user can get more good "karma" for lending something expensive that other users really want.

Also, as discussed above, lending or borrowing of free items may be excluded from calculations of a lending metric. Repeated lending to the same recipient may provide decreasing benefits to a user's lending metric. Doing so might encourage users to lend digital items not only to their close friends or family members, but to other users in the larger community of digital item consumers.

The use of a lending metric introduces an element of fairness or equity into the relationship between lenders and borrowers of digital items. Users may become frustrated with the lending system 108 if those that consume without contributing can reap all of the same benefits as those that frequently place digital items into the community by lending.

A handicapping module 630 may also serve to increase the perception of fairness or equity and a lender offers multiple social borrowers the chance to borrow a digital item by effectively leveling the playing field between respondents to the offer. Recall that the offer module 614 may generate an offer to loan a digital item to the first user that responds. Thus, someone who spends a lot of time in front of his or her consumption device may be the first person to notice such an offer and be able to borrow the digital item because he or she responded first. It may be perceived as unfair by other users if one or only a few users that are frequently quick to reply are the only users who receive the loan of a digital item through the first-to-reply mechanism initiated by the offer module 614.

In order to increase fairness and level the playing field, the handicapping module 630 may make it more difficult for these "frequent winners" to be counted as the first to respond to an offer. For example, if a digital item is lent to the first potential borrower to respond to an offer, the time of the response may be the deciding criterion. Typically, the time may be determined by a clock on one of the relevant computing devices. However, the true time may be modified by the handicapping module 630 based on a number of times that a potential borrower was previously the first one to respond to an offer. Of course the earlier offers were likely for different digital items, but the consideration may be a desire to provide users who do not spend all day with their eyes glued to a monitor a chance to be effectively considered the "first" to respond to an offer to lend. Thus, every time a user is the first one to respond to an offer, his or her subsequent response times for later offers may be delayed by some period of time. For example, each time a potential borrower is first to respond that adds one minute to any subsequent response times. After being first three times, all subsequent responses are effectively delayed three minutes. Other relationships between a number of times "being first" and magnitude of delay are also possible.

Each of the users that is not selected as a recipient, either because they were not the first to respond or because they did not meet some other criteria, and thus, are not selected as the one of the plurality of potential borrowers who is allowed to borrow the digital item may receive a consolation message generated by a messaging module 632. These users have already affirmatively indicated an interest in consuming the digital item by responding to an offer to borrow that digital item, and thus, this provides a marketing opportunity.

The consolation message generated by the messaging module 632 may include an invitation to buy a copy of the digital item and provide a link, button, or other UI element that allows convenient purchase of the digital item. The consolation message may also include a discount for purchasing a copy of the digital item. Thus, in one scenario, a user may receive a link in a message sent from a friend in a social network stating "Come and get it! First one to respond can borrow my digital copy of *The Red Pony*" and upon following the link be presented with an offer to borrow *The Red Pony* if he or she was the first to respond or alternatively for everyone who was not the first, receive a consolation message providing an opportunity to purchase a copy of that eBook.

All of the marketing opportunities provided when a user is unable to borrow a digital item can potentially lead to sales of copies of that digital item. The owner of the digital item that was the genesis for one of these marketing opportunities may receive a referral fee or commission when a copy of that digital item is sold due to the owner's lending activity. The lending system 108 includes a commission module 634 that computes the referral fee to be awarded. The fee may be a monetary amount, such as a portion of the sale proceeds. The fee may alternatively be in the form of credit or discounts to future purchases made by the lender. Further, the fee may be some form of non-monetary awards, such as an increase in his or her lending or metric points that may be redeemable for various awards. For example, the commission module 634 provide the owner of a digital item a portion of a purchase price when one of the plurality of potential borrowers buys a copy of the digital item in response to the consolation message generated by the messaging module 632.

An annotation module 636 may facilitate the recording and storage of annotations made to digital items. When a digital item is annotated by the user that owns the copy of the digital item, those annotations may become part of the item and borrowers may receive the digital item together with the annotations.

However, a lender may wish to lend out his or her digital items and receive them back free from annotations made by a borrower. In one implementation, borrowers may be prevented from annotating borrowed items. However, in another implementation borrowers may be allowed to annotate digital items that they have on loan, but those annotations may be stored separately from the digital item.

The annotation module 636 may differentiate annotations made by an owner or by a borrower and store imitations made by the borrower in association with that users profile and not in association with the loaned copy of the digital item. The borrower may be able to access and review his or her annotations even after returning the digital item to the owner. Also, the annotation module 636 may automatically "re-associate" those annotations with the same or different copy of the digital item when it becomes available to the borrower. For example, if a user borrows an eBook, makes annotations, and decides that he or she likes the eBook so much that he or she wants to own a copy, those annotations may be automatically associated with the "new" eBook as soon as the borrower completes the purchase.

The lending system 108 may also include a social networking module 202. The social networking module 202 maintains a record of the relationships in a social network such as shown in FIG. 2. Furthermore, the social networking module 202 also establishes connections between users in the social network when digital items are lent and/or borrowed. For example, loaning a digital item to another user in the social network may create a one-way connection, for example, designating the recipient as a follower of the lender. If the two users are exchange partners trading "loans" of digital items, each has borrowed a digital item from the other and this transaction may create a two-way connection that can be thought of as the two exchange partners being followers of each other, mutual friends, or whatever metaphor is appropriate for the social network.

Illustrative Processes

Figure 7:
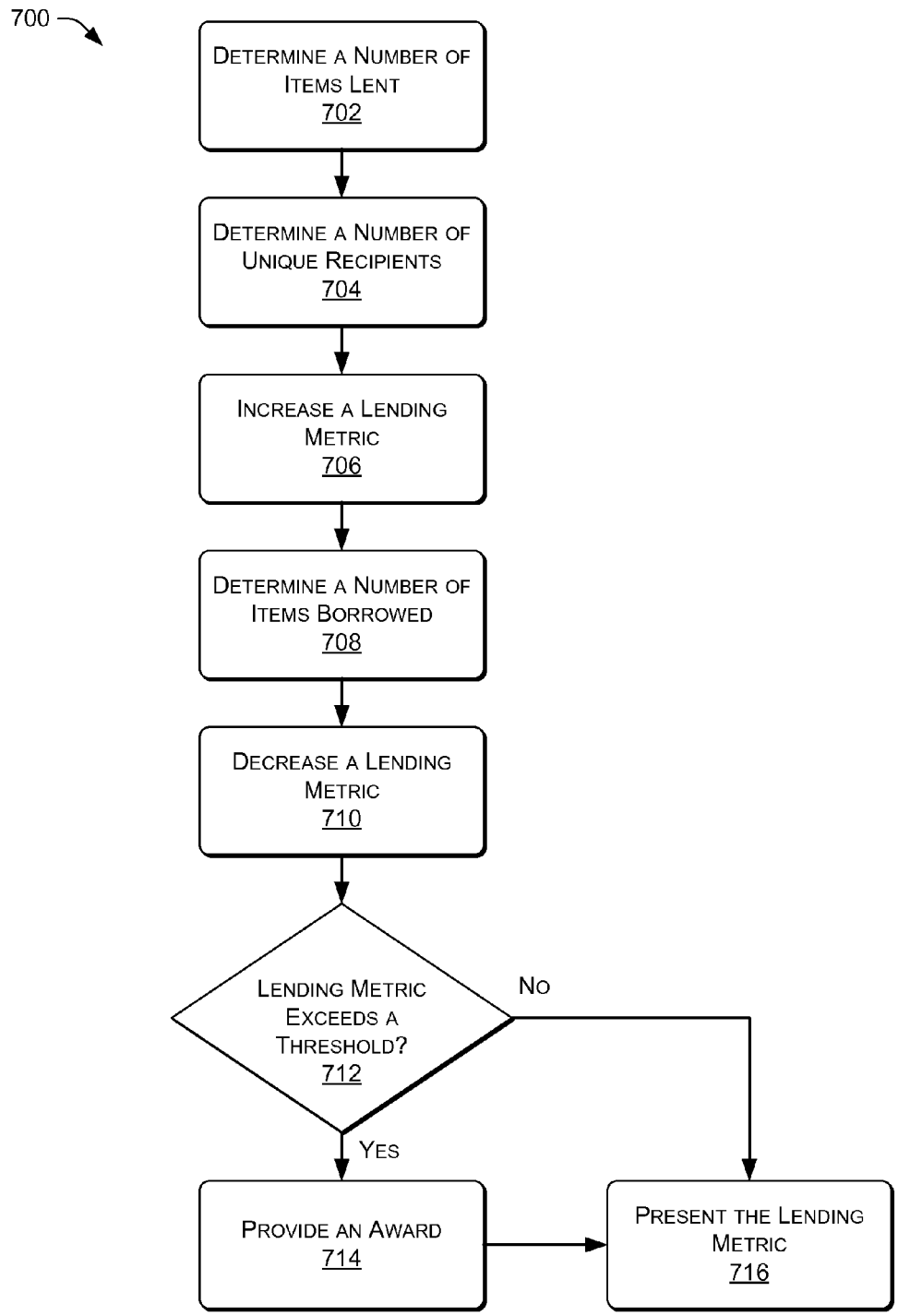
FIG. 7 is a flow diagram of an example process of modifying a lending metric based on lending and borrowing behavior.

FIG. 7 shows a process 700 of modifying a lending metric based on lending and borrowing behavior. The process 700 (as well as the processes shown in FIGS. 8-12) is illustrated as a collection of blocks in a logical flow graph, which represent a sequence of operations that can be implemented in hardware, software or a combination thereof. In the context of software, the blocks represent computer-executable instructions that, when executed by one or more processors, perform the recited operations. Generally, computer-executable instructions include routines, programs, objects, components, data structures and the like that perform particular functions or implement particular abstract data types. The order in which the operations are described is not intended to be construed as a limitation, and any number of the described blocks can be combined in any order and/or in parallel to implement the process.

The process 700 may be performed by the lending system 108 in the architecture 100 of FIG. 1. Additionally, all or part of process 700 may be performed by the lending metric module 332.

At 702, a number of digital items lent by a user is determined. The digital items may include eBooks and/or other types of digital items. In some implementations, the number is an integer number such as "10" if the user has loaned ten digital items At 704, a number of unique recipients for the digital items lent by the user is determined. For example, a user that lends only to his or her two best friends will show only two unique recipients regardless of how many digital items he or she lends. The number of unique users may affect a lending metric associated with the user. In some implementations, more unique users may result in a higher lending metric.

At 706, a lending metric associated with the user is increased based on the number of digital items lent by the user as determined at 702. The increase in the lending metric may also be modified by characteristics associated with the digital items.

At 708, a number of digital items borrowed by the user is determined. This number may also be an integer number such as "7" if the user has borrowed seven digital items. In some implementations, the number of digital items lent and borrowed as determined at 702 and 708 may represent "global" behavior between the user and any other user. In other implementations, the digital items lent by the user and the digital items borrowed by the user are digital items lent to and borrowed from a single other user. By limiting the consideration to only transactions between two users, each of the two users can readily assess if the net balance of the relations is positive or negative in terms of access to digital items.

At 710, the lending metric is decreased based on the number of digital items borrowed by the user as determined at 708. An amount the lending metric is increased for lending a digital item is not necessarily the same as an amount the lending metric is decreased for borrowing the digital item. In some implementations, an amount the lending metric decreases when one digital item is borrowed by the user is less than an amount the lending metric increases when one digital item is lent by the user. The lending metric may be calculated as the number of digital items lent by the user minus the number of digital items borrowed by the user.

At 712, it is determined if the lending metric exceeds a threshold. In this example, lending increases the lending metric, so a user that lends more relative to borrowing is more likely to exceed the threshold. In some implementations, there may be multiple thresholds and exceeding each threshold may lead to a different result. If the lending metric of the user exceeds the threshold, process 700 may process along the "yes" branch to 714.

At 714, an award is provided to the user. The award may be monetary or non-monetary. A non-monetary award may include a discount, points, tokens, access to content such as free digital items, the ability to borrow digital items without a decrease in associated lending metric, or any other type of incentive to encourage additional lending of digital items.

Returning to 712, if the lending metric does not exceed the threshold, process 700 proceeds along the "no" branch to 716. Process 700 also arrives at 716 from 714. At 716, the lending metric is presented. The lending metric may ultimately be presented whether or not the lending metric exceeds the threshold at 712.

Presenting the lending metric may include presenting the numerical difference between the number of digital items lent and the number of digital items borrowed. Each digital item may be given more or less weight in determining the lending metric based on characteristics of the digital item. The number of digital items lent by the user and the number of digital items borrowed by the user may be presented with the lending metric. For example, assuming all digital items are weighted as 1, a user that has lent 100 digital items and borrowed 98 digital items may have a lending metric of 2 displayed together with 100—loaned and 98—borrowed. One way of representing this lending metric is 2(100/98). A different user that has borrowed two digital items, but not lent any digital items may have a lending metric that is shown as −2(0/2).

The lending metric may alternatively or additionally be presented as non-numerical representation based on the numerical value of the lending metric. For example, a lending metric about 10 may be represented as one gold star, when the lending metric exceeds 25 that representation may be two gold stars. A negative lending metric may be represented by an unhappy face, etc. The lending metric may be displayed on a profile page of the user or available only to other users that are connected to the user through a social network. Also, the lending metric may be displayed to any other user that may lend or borrow a digital item from this user.

Figure 8:
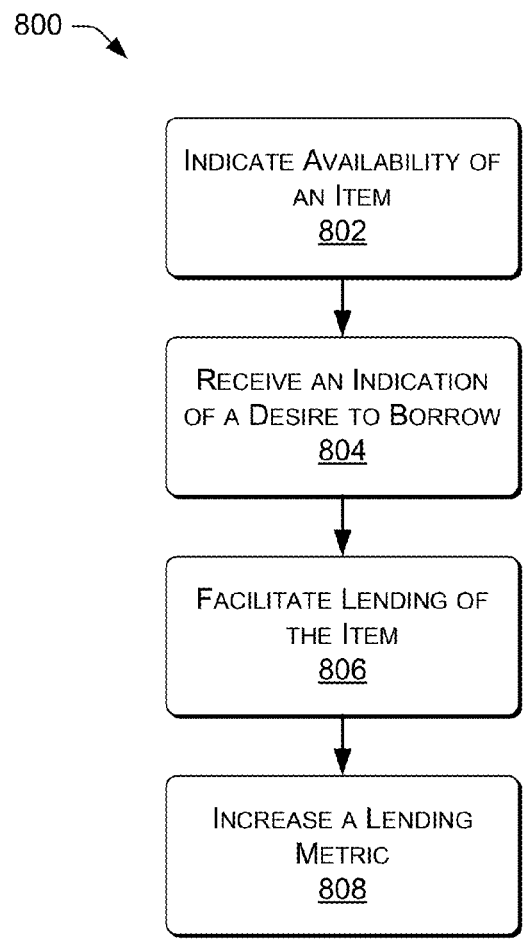
FIG. 8 is a flow diagram of an example process of facilitating lending of digital items that and increasing a lending metric of the lender.

FIG. 8 shows a process 800 of facilitating lending of digital items and increasing a lending metric of the lender. Process 800 may be implemented in part by the lending system 108.

At 802, the availability of a digital item for borrowing from a first user is indicated. The indication may be provided to only one potential borrower. For example, the first user may selectively direct the indication to a friend. In other implementations, the indication is provided to two or more potential borrowers. This includes broadcasting the indication to all other users in the lender/borrower community.

However, the indication may be sent to a more selective group than all other users, yet a larger group than just a single other user. For example, the potential borrowers that receive the indication may be users that have a characteristic specified by the first user. The characteristic may be anything associated with the user's identities or profiles including, lending metric, position in a social network, geographic location, age, gender, digital item preferences or consumption history, type of device used to consume digital items, etc.

At 804, an indication that a second user desires to borrow the digital item from the first user is received. The indication may be communicated by email, through a social network, or by any other technique. For example, placing the digital item in a list of digital items that the potential borrower wishes to borrow is one way for the second user to indicate that he or she desires to borrow the digital item. In some implementations the indication may not be presented to the first user, but rather received only by the first user's computing device.

At 806, lending of the digital item from the first user to the second user is facilitated. The lending module 412 may facilitate the loan.

At 808, in response to facilitating the lending at 806, the lending metric associated with the first user is increased. The lending metric may be increased more if the first user has not yet consumed the digital item. Recently released digital items as well as expensive or popular digital items may cause a larger increase in the lending metric. The increase in the lending metric may be implemented by the lending metric module 332.

Figure 9:
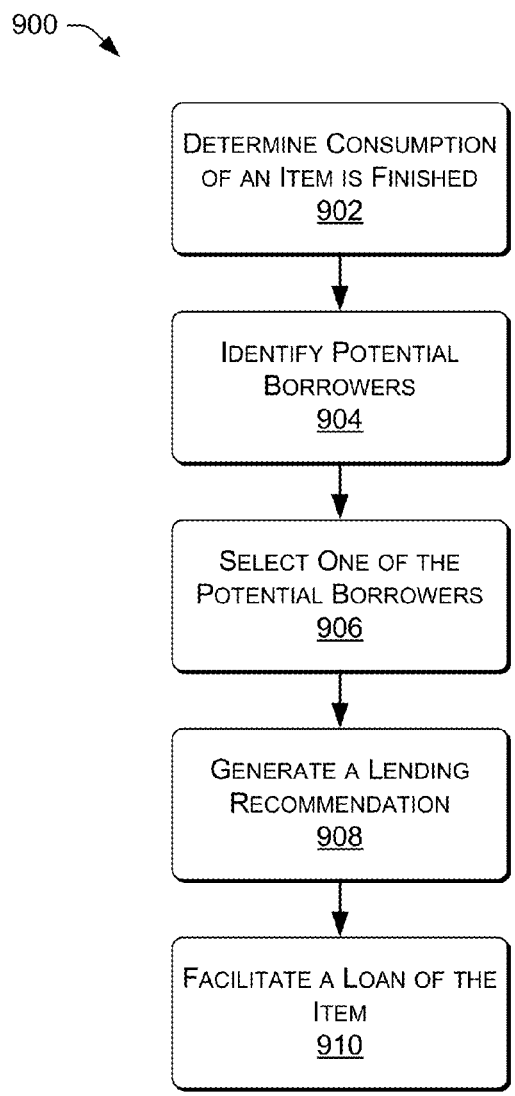
FIG. 9 is a flow diagram of an example process of recommending a borrower to loan a digital item upon the owner of the digital item consuming or abandoning the digital item.

FIG. 9 shows a process 900 of recommending a borrower to loan a digital item upon the owner of the digital item completing consumption of the digital item. Process 900 may be implemented by the lending system 108.

At 902, it is determined that an owner of a digital item has finished consuming the digital item. This determination may be performed by a device such as a dedicated eBook reader device that renders digital items, such as eBooks, for consumption. For example, after viewing the last page of a section of an eBook, an eBook reader device may determine that the owner is finished reading the eBook. If it is determined that the owner abandoned the eBook (i.e., has expressed an intention to not read it any further) that may also be interpreted as finishing the eBook.

At 904, potential borrowers of the digital item that are connected to the lender in a social network and that indicate a desire to borrow the digital item are identified. The social network may be a social network that is not directly connected with lending and borrowing of digital items. However, in some implementations, the social network may be formed by lending and borrowing digital items. For example, each loan a digital item creates a connection between the user that loaned an item and the user that borrowed the item. The indication of the desire to borrow the digital item may be manifested by direct communication to the owner of the digital item, by placing the digital item in a list of digital items that the potential borrower wishes to borrow, in a list of digital items that the potential borrower wishes to purchase, or by another technique.

At 906, one of the potential borrowers is selected based on a characteristic of the potential borrower. The characteristic of the potential borrower may be a level of centrality in the social network that is above a threshold level. A user with high centrality in a social network is connected to a large number of other users and the centrality may suggest a level of influence such that anything the user is consuming, even a borrowed content item, may become more popular merely because it is consumed by this user with a high centrality.

The characteristic used to select a borrower from the potential borrowers may include the potential borrower having a similar consumption pattern of digital items as the owner. These consumption patterns may be observed or inferred from analysis of lists of content items associated with the owner and with the potential borrower as shown in FIG. 5. A user that likes the same things may be someone with whom the owner wishes to develop a lending/borrowing relationship.

The characteristic may additionally or alternatively include past lending and borrowing activity between the owner and the potential borrower. If the owner has borrowed may digital items from another user in the past, the owner may want to repay that by lending a digital item to that user. The characteristic may also include a lending metric of the potential borrower. Potential borrowers with high lending metrics may be selected before potential borrowers with low lending metrics.

The hardware devices associated with the potential borrower may also be a characteristic used to select the potential borrower. For example, if the digital item is an eBook, potential borrowers without a dedicated eBook reader device may be selected so that receiving the loan of the eBook may motivate purchase of a dedicated eBook reader device. In some implementations, the eBook or other digital item may be consumed on many types of devices such as general purpose computers so that purchase of a specialized rendering device is not necessary.

At 908, a recommendation that the owner lend the digital item to the selected one of the potential borrowers is generated. The recommendation module 624 may generate this recommendation. In order to appear as a natural continuation of the digital item, the recommendation may be generated in a same format as content of the digital item. For example, if the digital item is an eBook, then the recommendation may be generated as text in the same font and layout as the eBook and appear as the last page of the eBook. The recommendation may be a message along the lines of: "Now that you have finished reading this eBook, would you like to lend it to your friend Simon?"

At 910, a loan of the digital item from the owner to the potential borrower, now actual borrower, is facilitated. Making the loan increases a lending metric of the owner. Receiving the loan decreases a lending metric of the potential, now actual, borrower.

Figure 10:
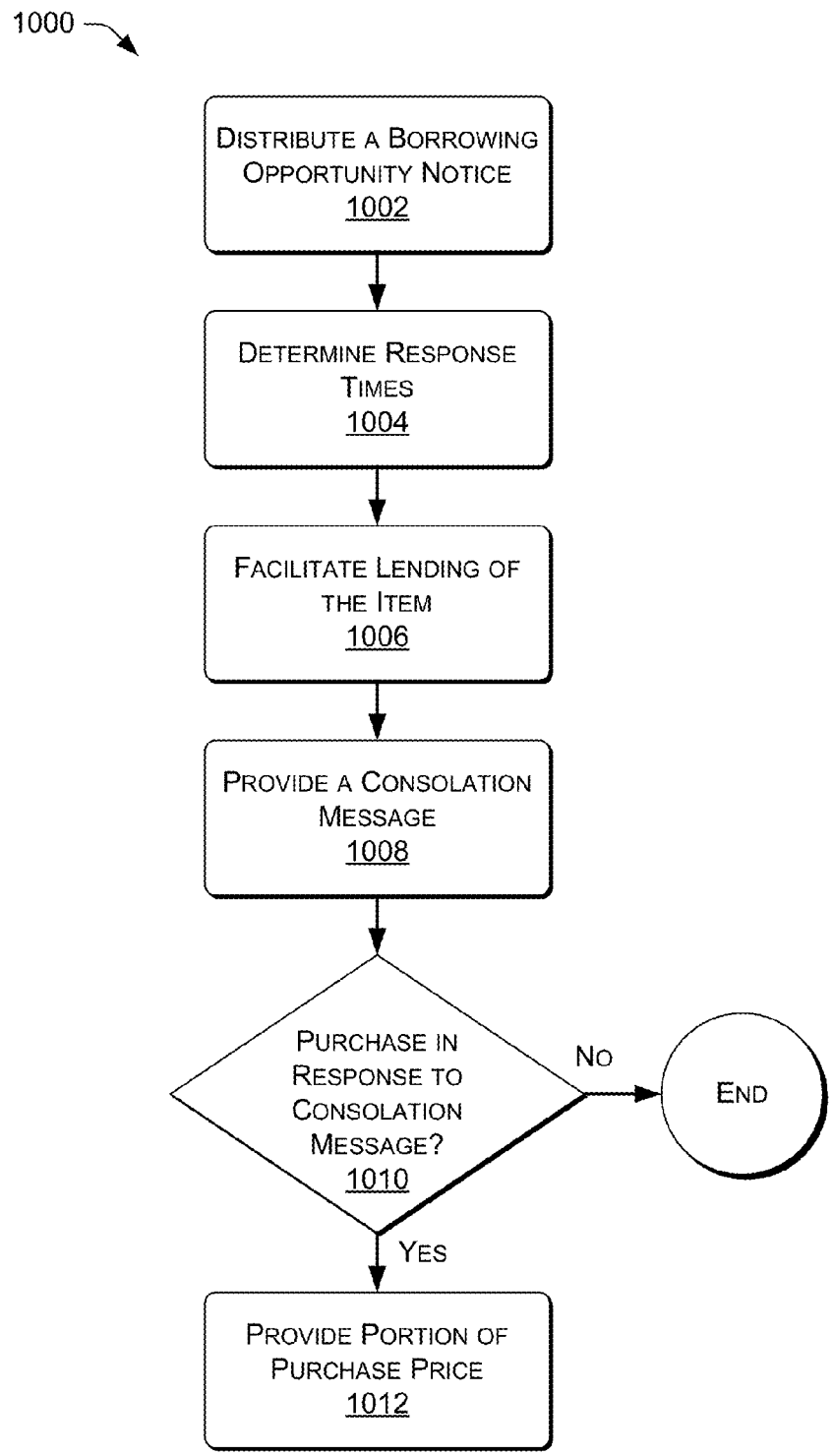
FIG. 10 is a flow diagram of an example process of facilitating lending of a digital item to a first user that responds to a notice of a lending opportunity and providing a commission payment to the lender if a user that is not able to borrow the digital item instead purchases the digital item.

FIG. 10 shows a process 1000 of facilitating lending of a digital item to a first user that responds to a notice of a lending opportunity and providing a commission payment to the lender if a user that is not able to borrow the digital item instead purchases the digital item. Process 1000 may be implemented by the lending system 108 using the offer module 614, the messaging module 632, and the commission module 634.

At 1002, a notice of a borrowing opportunity to borrow a digital item is distributed to a plurality of potential borrowers. In some implementations, the notice may be provided over a social network from a member of the social network to his or her followers in the social network. The potential borrowers may included only those users that are connected to the owner of the digital item through the social network with primary, secondary, tertiary, or more distance connections.

Each of the potential borrowers may also be specified by the owner of the digital item. For example, the owner may select five friends he or she knows are interested in the digital item and choose to distribute the notice of a borrowing opportunity to those five people. By lending to the first one that responds, the owner has avoided the hard decision of choosing who gets to borrow the digital item. This may be a more difficult decision if a number of times that the digital item may be lent is limited either by the owner or by a rights holder (e.g., publisher).

At 1004, a response time for ones of the plurality of potential borrowers that respond to the notice is determined. Depending on the context in which the borrowing opportunity is presented, the response times may be in seconds, minutes, hours, or a longer length of time. For example, a first potential borrower to respond may respond in 1:06 and the second potential borrower to respond may respond in 1:10.

The true response times may be modified so that users who have recently been first to respond to an earlier notice are handicapped. For example, an amount of time is added to a response time for a one of the potential borrowers that previously had a shortest response time in response to a previous notice of a borrowing opportunity to borrow a different digital item. Adding this additional amount of time, or handicap, generates a modified response time that is slower than the actual response time. Conversely, potential borrowers that are always slow or have never been first may be advantaged by modified response times that are faster than their actual response times.

At 1006, lending of the digital item to the one of the plurality of potential borrowers that responds to the notice having a shortest response time is facilitated. The quickest one to click back or otherwise respond to the notice gets to borrow the digital item. The modified response times may be used to differentially handicap and assist the potential borrowers based on past results.

At 1008, a consolation message is provided to the ones of the plurality of potential borrowers that responded to the notice having a response time longer than the shortest response time. These potential borrowers may not know that someone else has already been selected to borrow the content item at the time they respond. Thus, when responding to the notice each of these potential borrowers is hoping to borrow the digital item.

The consolation message may include an offer to sell a copy of the digital item. Thus, the slower potential borrowers may click on a link to borrow the digital item and receive a message indicating that someone else was faster, but offering a way to buy the digital item instead. The consolation message may also include a discount price for the copy of the digital item.

At 1010, it is determined if any of the plurality of potential borrowers that respond to the notice having a response time longer than the shortest response time purchase a copy of the digital item in response to the consolation message. If not, process 1000 follows the "no" branch and may end.

If one of the potential borrowers that did not get the loan does make a purchase in response to the consolation message, process 1000 follows the "yes" branch to 1012 and a portion of the purchase price of the copy of the digital item is provided to the owner of the digital item. In this implementation, users are incentivized to offer loans of digital items to others that are likely to buy a copy if they receive a consolation message. This may generate a type of user-driven advertising in which one potential borrower is able to borrow and consume the digital item for free, but some number of other potential borrowers choose to purchase a copy of the digital item.

Figure 11:
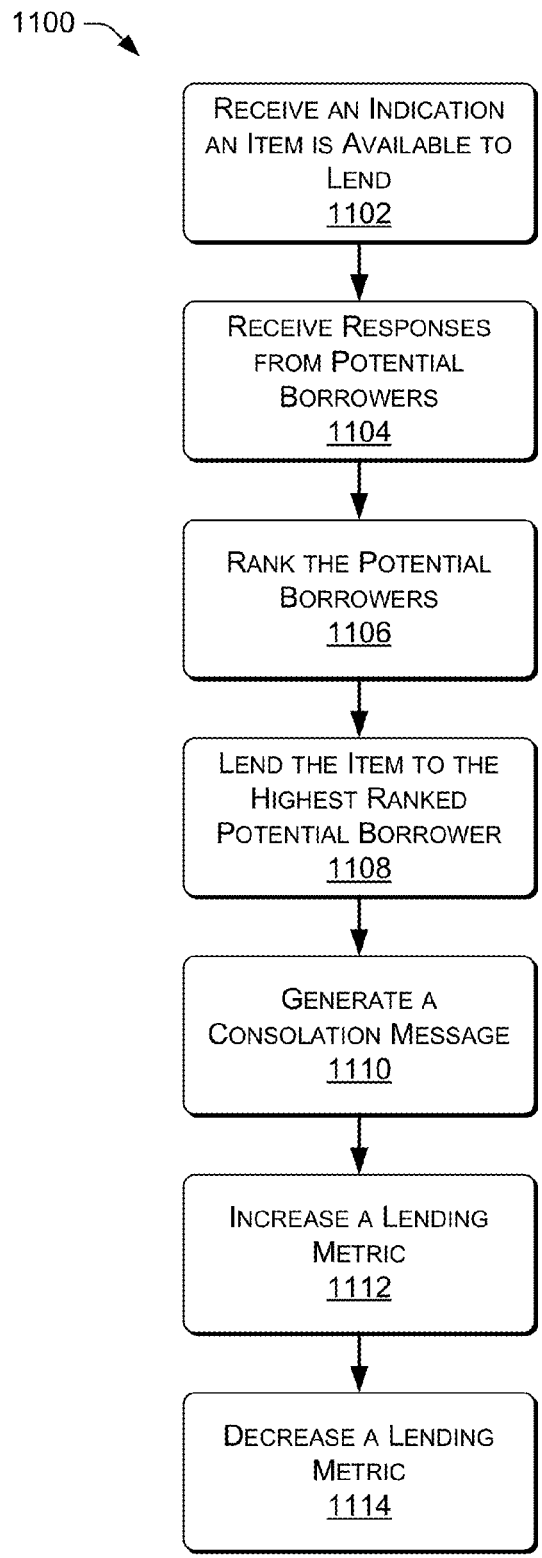
FIG. 11 is a flow diagram of an example process of facilitating lending of a digital item to a potential borrower that responds to an indication that the digital item is available.

FIG. 11 shows a process 1100 of facilitating lending of a digital item to a highest ranked potential borrower that responds to an indication that the digital item is available. Process 1100 may be implemented in whole or part by the lending system 108.

At 1102, indication is received from a lender of a digital item that is available to lend. The indication may be sent by any type of communication technology and indicate intended recipients for the communication. For example, the lender 102 may interact with the lender device 104 to specific the digital item and a plurality of other users to whom the lender is willing to lend. In some implementations, the indication may be received by the offer module 614.

At 1104, a plurality of responses from a plurality of potential borrowers that wish to borrow the digital item are received. Less than all of the potential borrowers who receive the offer may respond. For example, if the indication is sent to every other user connected to the network 110 in architecture 100 it is possible that only a small percentage of the potential borrowers will respond to the offer. However, if the digital item is eligible for lending only once or a few times, it may be necessary to further reduce the number of potential borrowers.

At 1106, the plurality of potential borrowers are ranked. In some implementations, the ranking may be performed by the filtering module 620 and/or the selection module 622.

At 1108, lending of the digital item from the lender to a highest ranked one of the plurality of potential borrowers is facilitated. The lending module 412 may facilitate the lending in some implementations. Lending may involve transferring data associated with the digital item to the borrower. Lending may additionally or alternatively involve providing the borrower, or borrower's device, with access to the content item stored remotely such as on the lending broker 112.

In one implementation, the ranking of the potential borrowers is based on a time that each of the responses are received. This may cause the first potential borrower to respond to be the highest ranked potential borrower. However, other arrangements are also possible such as the slowest potential borrower to respond, the potential borrower who responds closest to a predetermined time (which may or may not be disclosed to the potential borrowers), or any other time-based ranking scheme.

In another implementation, the ranking of the potential borrowers is based on a lending metric associated with each of the potential borrowers. For example, out of all the potential borrowers who respond, the one having the highest lending metric becomes the highest ranked one of the plurality of potential borrowers. Thus, a high lending metric serves as a benefit because the high lending metric increases a user's chances of be being selected to receive the loan of this digital item. Having a high lending metric as a deciding criterion may also balance lending and borrowing between users because the potential borrower with the highest lending metric is likely a user that frequently loans digital items to others, so that could be balanced out at least partially by loaning a digital item to this user.

Combinations of speed and lending metric may also be used to rank the potential borrowers. For example, the highest ranked potential borrower may be the first user with a lending metric above a certain threshold to respond.

The lending metric used to determine a ranking of the potential borrowers may be determined from past lending and borrowing activity between the owner of the digital item and the one of the potential borrowers. The owner may care less about how much each of the potential borrowers lends to others in general and instead wishes to loan this digital item to the potential borrower that has lent the most to him or her in the past. Thus, instead of considering a "global" lending metric, a "personal" lending metric based just on transactions between the owner and one of the potential borrowers may be used.

In a further implementation, the ranking of the potential borrowers is based on a connection between the lender and each of the plurality of potential borrowers in a social network. Potential borrowers with the closest connections (e.g., primary connections) may have the highest ranking Alternatively, potential borrowers with the most distant connections, or with no connection at all (e.g., "unconnected" members of the social network) to the owner may be the highest ranked. The distance and type of connection in the social network may be determined by the social networking module 202.

Combinations of any of the above considerations may also be used to arrive at a highest ranked potential borrower. For example, the highest ranked potential borrower may be the potential borrower with the highest lending metric with respect to the owner who also has a primary connection to the owner in the social network (e.g., the one of the close friends who has lent the most to the owner in the past).

The lending metric of the potential borrowers may also be combined with any of the other considerations to prevent a potential borrower having a lending metric below a threshold as being ranked as the highest ranked one of the plurality of potential borrowers. This may prevent "leeches" from receiving the loan of a digital item without regard to a response speed or position in a social network.

In a further implementation, the ranking of the potential borrowers is based on a number of times each of the potential borrowers was previously the highest ranked one of the plurality of potential borrowers with respect to a different digital item that was previously available to lend. This modification to the ranking may make it more difficult for the same user to be repeatedly identified as the highest ranked potential borrower. The handicapping module 630 may implement this modification to the ranking. For example, if a potential borrower would otherwise be ranked first (e.g., based on speed, social network connection, lending metric, etc.) he or she may be demoted a rank for each time that he or she was previously ranked first.

At 1110, a consolation message for ones of the plurality of potential borrowers that are not the highest ranked one of the plurality of potential borrowers is generated. The messaging module 646 may, in some implementations, generate the consolation message. The consolation message may be similar to the consolation messages generated at 1008 in process 1000.

At 1112, a lending metric associated with an owner of the digital item is increased when the digital item is lent to the highest ranked one of the plurality of potential borrowers. The amount of the increase may depend in part on characteristics of the digital item as discussed above.

At 1114, a lending metric associated with the highest ranked one of the plurality of potential borrowers is decreased when the digital item is borrowed. The decrease may be the same amount as the increase at 1112, but in an opposite direction. The decrease may alternatively be a different amount than the increase in the lending metric at 1112. Similar to the increase, the decrease in the lending metric of the borrower may depend in part on characteristics of the digital item. Both the increase at 1112 and the decrease at 1114 may be implemented by the lending metric module 332.

Figure 12:
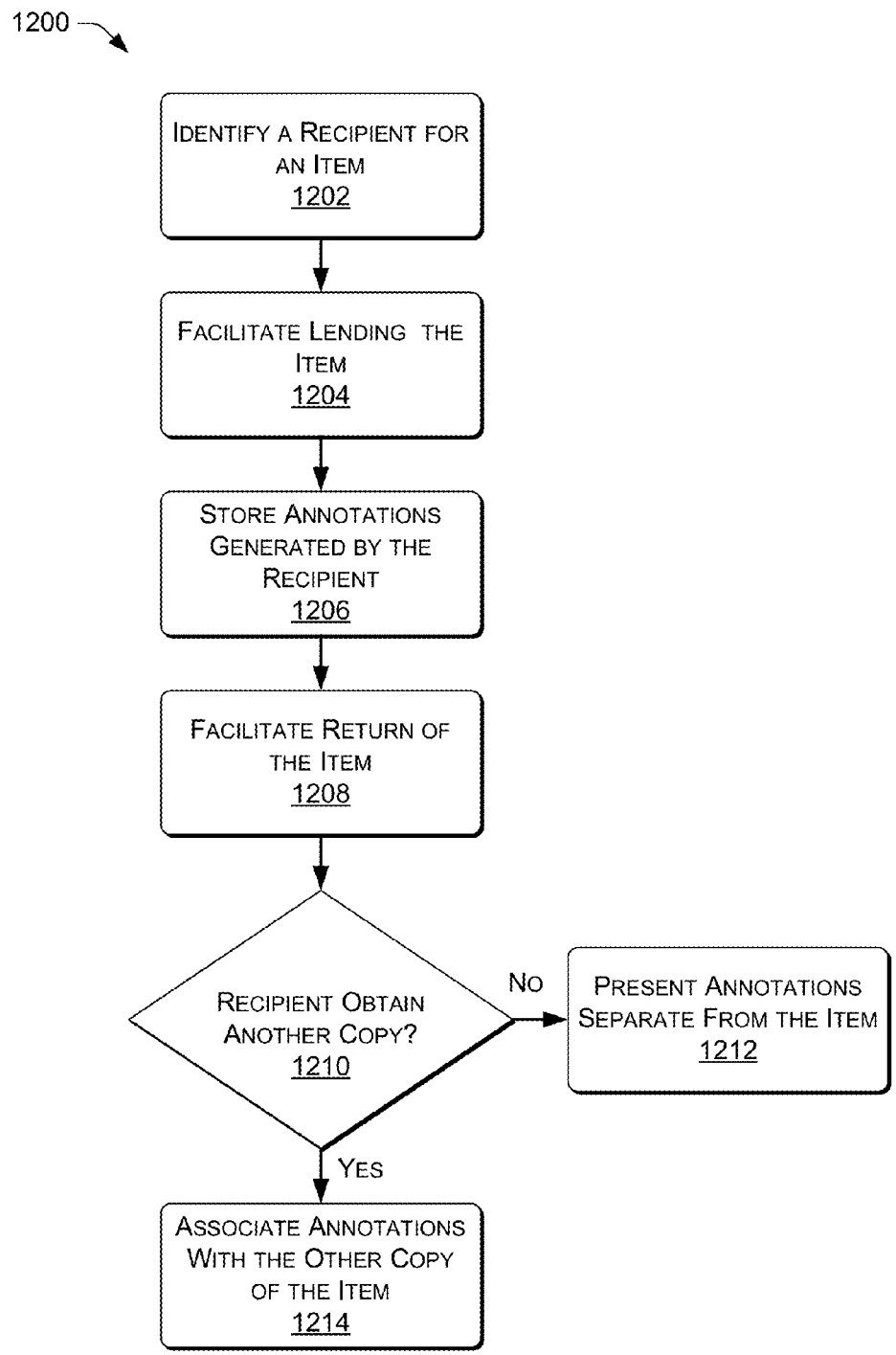
FIG. 12 is a flow diagram of an example process of storing annotations of a borrowed digital item in association with the user that borrowed the digital item and made the annotations.

FIG. 12 shows a process 1200 of storing annotations of a borrowed digital item in association with the user that borrowed the digital item and made the annotations. Process 1200 may be implemented in whole or part by the lending system 108 such as by the annotation module 636 of the lending system 108.

At 1202, a recipient for a copy of a digital item is identified. The recipient may be identified through any of the previously discussed techniques or simply designated by the lender of the digital item such as through entry of the recipient's email address. For example, the recipient may be identified based on a characteristic of the recipient.

At 1204, lending the copy of the digital item from the lender to the recipient is facilitated. As discussed above, the lending module 412 may facilitate the loan of this digital item. The loaned copy may be the specific data representing the copy of the digital item, out of all the copies of the same common work, owned by the lender.

At 1206, annotations of the digital item generated by the recipient while consuming the digital item are stored. The annotations may be stored in association with the recipient such as part of the recipient's user profile. The annotations may also be stored separately from the copy of the digital item. When the digital item is an eBook or other textual document, the annotations may include such things as margin notes, underlining, highlighting, etc.

At 1208, return of the copy of the digital item to the lender without the annotations generated by the recipient is facilitated. Thus, the lender gets back an unmarked copy of his or her digital item, but the annotations remain for the borrower to access. Data representing the copy of the digital item may be transferred back to a device of the lender without transfer of data representing the annotations. Alternatively, the lender may gain access to the copy of the digital item stored in the cloud or remote storage, but not gain access to the borrower's annotations, thus the copy of the digital item as perceived by the lender does not include the annotations.

At 1210, it is determined if the recipient has obtained access to another (or the same) copy of the digital item. For example, the recipient may purchase his or her own copy of the digital item after borrowing the lender's copy. The recipient may also borrow another copy of the same digital item from a different lender or even borrow the same copy from the lender a second time.

However, if the recipient has not obtained another copy of the digital item, process 1200 follows the "no" branch to 1212. At 1212, the annotations are presented to the recipient when the recipient is unable to access the same or a different copy of the digital item. The recipient may see his or her notes, underlines, and such separate from the digital item.

If the recipient does obtain another, or the same, copy of the digital item, then process 1200 follows the "yes" branch to 1214. At 1214, the annotations are automatically associated with the copy of the digital item upon the recipient accessing the copy of the digital item. Thus, a "new" copy of the digital item purchased by the recipient will include all the annotations that the recipient made to the copy borrowed from the lender. Also, if the recipient borrows the same copy from the lender one more time, the recipient's annotations will be automatically re-associated with that copy while it is accessible to the recipient.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A non-transitory computer-readable storage media storing computer-readable instructions that, when executed, instruct a processor to perform acts comprising:
   determining a number of digital items lent by a user;
   increasing a lending metric associated with the user based at least in part on the number of digital items lent by the user, wherein the increasing the lending metric associated with the user is based at least in part on at least one characteristic of each of the digital items lent by the user;
   determining a number of digital items borrowed by the user; and
   decreasing the lending metric based at least in part on the number of digital items borrowed by the user, wherein the decreasing the landing metric is based at least in part on at least one characteristic of each of the digital items borrowed by the user.

2. The non-transitory computer-readable storage media of claim 1, wherein the digital items comprise electronic books.

3. The non-transitory computer-readable storage media of claim 1, wherein the lending metric comprises the number of digital items lent by the user minus the number of digital items borrowed by the user.

4. The non-transitory computer-readable storage media of claim 1, wherein an amount the lending metric decreases when one digital item is borrowed by the user is less than an amount the lending metric increases when one digital item is lent by the user.

5. The non-transitory computer-readable storage media of claim 1, wherein the determining a number of digital items lent by the user and the determining a number of digital items borrowed by the user excludes free digital items.

6. The non-transitory computer-readable storage media of claim 1, wherein the determining a number of digital items lent by the user further comprises determining a number of unique recipients for the digital items lent by the user and the lending metric associated with the user is based at least in part on the number of unique recipients.

7. The non-transitory computer-readable storage media of claim 1, wherein the digital items lent by the user and the digital items borrowed by the user are digital items lent to and borrowed from a single other user.

8. The non-transitory computer-readable storage media of claim 1, further comprising providing an award to the user when the lending metric exceeds a threshold value.

9. The non-transitory-readable storage media of claim 8, wherein the award comprises a non-monetary award.

10. The non-transitory computer-readable storage media of claim 1, further comprising presenting the lending metric.

11. The non-transitory computer-readable storage media of claim 10, wherein the presenting the lending metric comprises presenting the number of digital items lent by the user and the number of digital items borrowed by the user.

12. The non-transitory computer-readable storage media of claim 10, wherein the presenting the lending metric comprises presenting the lending metric in a profile of the user.

13. The non-transitory computer-readable storage media of claim 10, wherein the presenting the lending metric comprises presenting a non-numerical representation of the lending metric, the non-numerical representation based at least in part on a the numerical value of the lending metric.

14. The non-transitory computer-readable storage media of claim 1, further comprising presenting the lending metric to other users connected to the user in a social network and not presenting the metric to other users that are not connected to the user in the social network.

15. The non-transitory computer-readable storage media of claim 14, wherein connections are formed between users in the social network when one of the users lends a digital item to or borrows a digital item from another one of the users.

16. The non-transitory computer-readable storage media of claim 14, wherein the social network comprises other users that are followers of the user or other users that are followed by the user, and wherein the user is connected to the followed users and the following users in the social network.

17. A computer-implemented method, comprising:
   under control of one or more processors configured with specific executable instructions,
   indicating availability of a digital item for borrowing from a first user who is associated with a lending metric;
   receiving an indication that a second user desires to borrow the digital item from the first user;
   facilitating lending of the digital item from the first user to the second user; and
   responsive to the facilitating, increasing the lending metric associated with the first user by an amount that is at least in part based on at least one characteristic of the loaned digital item.

18. The computer-implemented method of claim 17, wherein the digital item is eligible for lending a limited number of times.

19. The computer-implemented method of claim 18, wherein the limited number of times is specified by an entity having rights in the digital item.

20. The computer-implemented method of claim 17, wherein indicating availability of the digital item for borrowing comprises providing an indication to a single potential borrower.

21. The computer-implemented method of claim 17, wherein indicating availability of the digital item for borrowing comprises providing an indication to two or more potential borrowers.

22. The computer-implemented method of claim 21, wherein the two or more potential borrowers comprise other users having a characteristic specified by the first user.

23. The computer-implemented method of claim 17, wherein the first user is prevented from consuming the digital item during the duration of the lending of the digital item from the first user to the second user.

24. The computer-implemented method of claim 17, wherein the at least one characteristic of the digital item comprises a purchase price of the digital item, a rating of the digital item, a rank of the digital item, a number of users waiting to borrow the digital item, an amount of time since the digital item was released, or a status of the digital item as consumed or not consumed by the first user.

25. A non-transitory computer-readable storage media storing computer-readable instructions that, when executed, instruct a processor to perform acts comprising:
   indicating that a digital item of a first user is available for borrowing from the first user;
   receiving an indication that a second user desires to borrow the digital item from the first user;
   determining if the second user has previously borrowed the digital item from the first user or from another user;
   at least partly in response to determining that the second user has not previously borrowed the digital item, sending information to at least one of a device of the first user and a device of the second user related to lending of the digital item from the first user to the second user; and
   at least partly in response to determining that the second user has previously borrowed the digital item, at least one of:

sending, to the device of the first user, information related to refraining from lending of the digital item to the second user; and refraining from indicating, in subsequent indications to the second user, that the digital item of the first user is available for borrowing.

26. The non-transitory computer-readable storage media of claim 25, the acts further comprising, based at least in part on receiving an indication of the lending of the digital item from the first user to the second user, increasing a lending metric of the first user and decreasing a lending metric of the second user.

27. The non-transitory computer-readable storage media of claim 25, the acts further comprising, at least at least partly in response to the determining that the second user has previously borrowed the digital item, generating a consolation message for the second user to indicate that the second user was not selected for the lending of the digital item to the second user.

28. A computing system comprising:
one or more processors;
memory accessible by the one or more processors;
a request module stored in the memory and executable by the one or more processors to receive a request from a user to borrow a digital item;
a queuing module stored in the memory and executable by the one or more processors to place the request from the user in a queue to receive a loan of the digital item;
a lending module stored in the memory and executable by the one or more processors to provide the user with access to the digital item when the request from the user reaches a top of the queue; and
a lending metric module stored in the memory and executable by the one or more processors to decrease a lending metric associated with the user by an amount that is at least in part based on a characteristic of the borrowed digital item when the user receives access to the digital item.

29. The computing system of claim 28, wherein the digital item comprises one of an electronic book, an audio item, a video item, a multimedia item, or a graphical item.

30. The computing system of claim 28, wherein the request is inferred by the request module when the user includes the digital item in a list of multiple digital items.

31. The computing system of claim 28, wherein:
the queuing module prevents the user from placing a request in the queue when the lending metric associated with the user is less than a threshold level; or
the lending module refrains from providing the user with access to the digital item when the lending metric associated with the user is less than the threshold level.

32. The computing system of claim 31, wherein the position of the request from the user in the queue is based at least in part on a number of copies of the digital item available to borrow and a number of user requests in the queue.

33. The computing system of claim 28, wherein the queuing module is configured to modify or set a position in the queue of the request from the user based at least in part on the lending metric associated with the user.

34. The computing system of claim 33, wherein the queuing module is configured to move the request from the user to the top of the queue or place the request from the user to the top of the queue when the lending metric associated with the user is more than a threshold level.

35. The computing system of claim 28, further comprising a notification module stored in the memory and executable by the one or more processors to notify the user of a position of the request from the user in the queue.

36. The computing system of claim 28, further comprising a timing module stored in the memory and executable by the one or more processors to prevent the user from accessing the digital item upon expiration of a predetermined time period.

37. The computing system of claim 36, wherein the timing module determines a consumption rate at which that the user consumes the digital item and, based at least in part on the consumption rate, determines if the user will consume the entire digital item before expiration of the predetermined time period.

38. The computing system of claim 37, wherein the timing module generates an indication for the user when the timing module determines that the user will not consume the entire digital item before expiration of the predetermined time period.

39. The computing system of claim 38, wherein the indication informs the user of a consumption speed sufficient to consume the entire digital item before expiration of the predetermined time period.

40. The computing system of claim 38, wherein the indication offers the user a discount for purchase of the digital content item.

41. The non-transitory storage media of claim 1, wherein the at least one characteristic of each of the digital items lent by the user and the at least one characteristic of each of the digital items borrowed by the user comprises a purchase price of the digital item, a rating of the digital item, a rank of the digital item, a number of users waiting to borrow the digital item, an amount of time since the digital item was released, a status of the digital item as consumed or not consumed by the first user, or a number of times the digital work is available for lending.

* * * * *